(12) United States Patent
Li

(10) Patent No.: US 10,605,073 B2
(45) Date of Patent: Mar. 31, 2020

(54) SYSTEM AND METHODOLOGY OF LOOK AHEAD AND LOOK AROUND LWD TOOL

(71) Applicant: Shanjun Li, Katy, TX (US)

(72) Inventor: Shanjun Li, Katy, TX (US)

( * ) Notice: Subject to any disclaimer, the term of this patent is extended or adjusted under 35 U.S.C. 154(b) by 0 days.

(21) Appl. No.: 15/771,176

(22) PCT Filed: Sep. 10, 2017

(86) PCT No.: PCT/US2017/050865
§ 371 (c)(1),
(2) Date: May 8, 2018

(87) PCT Pub. No.: WO2018/052819
PCT Pub. Date: Mar. 22, 2018

(65) Prior Publication Data
US 2018/0306024 A1    Oct. 25, 2018

Related U.S. Application Data

(60) Provisional application No. 62/395,176, filed on Sep. 15, 2016.

(51) Int. Cl.
*E21B 47/022* (2012.01)
*G01V 3/26* (2006.01)
*G01V 1/50* (2006.01)
*G01V 3/30* (2006.01)

(52) U.S. Cl.
CPC .......... *E21B 47/02216* (2013.01); *G01V 1/50* (2013.01); *G01V 3/26* (2013.01); *G01V 3/30* (2013.01); *G01V 2200/16* (2013.01)

(58) Field of Classification Search
CPC ... G01V 3/26; G01V 1/50; G01V 1/44; G01V 3/20; G01V 2200/16; E21B 47/02216
See application file for complete search history.

(56) References Cited

U.S. PATENT DOCUMENTS

| | | | |
|---|---|---|---|
| 6,181,138 B1 | 1/2001 | Hagiwara et al. | |
| 9,753,175 B2 | 9/2017 | Li et al. | |
| 2007/0235225 A1 | 10/2007 | Bittar et al. | |
| 2009/0230968 A1 | 9/2009 | Bittar et al. | |
| 2011/0051552 A1 | 3/2011 | Pistre et al. | |
| 2011/0071762 A1* | 3/2011 | Hagiwara | G01V 3/28 702/6 |
| 2011/0251794 A1* | 10/2011 | Bittar | G01V 3/30 702/11 |
| 2011/0298461 A1 | 12/2011 | Bittar et al. | |
| 2013/0076306 A1* | 3/2013 | Lee | H02J 7/025 320/108 |
| 2013/0105224 A1 | 5/2013 | Bittar et al. | |
| 2013/0320985 A1* | 12/2013 | Liu | G01V 3/12 324/339 |

(Continued)

*Primary Examiner* — Huy Q Phan
*Assistant Examiner* — Zannatul Ferdous
(74) *Attorney, Agent, or Firm* — Enshan Hong; VLP Law Group LLP

(57) ABSTRACT

The present invention provides a methodology and system for formation boundary detection ahead and around of a drilling bit. By setting symmetrical design of receivers/transmitters around a transmitter/receiver and the direction of the receivers/transmitters, the system can measure the signals reflected by a formation boundary ahead of and around the drilling bit. The measured signals can be used to determine formation boundary positions.

23 Claims, 34 Drawing Sheets

(56) References Cited

U.S. PATENT DOCUMENTS

2014/0244174 A1    8/2014  Li et al.
2014/0249754 A1    9/2014  Donderici et al.
2014/0350858 A1*  11/2014  Donderici ................ E21B 7/04
                                                    702/7

* cited by examiner

SYSTEM AND METHODOLOGY OF LOOK AHEAD AND LOOK AROUND LWD TOOL

FIELD OF INVENTION

The present invention relates to electromagnetic (EM) logging while drilling (LWD) systems and the methodologies upon which the systems rely to measure formation parameters. One application of the present invention is to measure the formation parameters around and ahead of a drilling device.

BACKGROUND OF THE INVENTION

Logging while drilling (LWD) generally refers to the measurement of land formation properties during the excavation of a wellbore or other hole through the use of tools integrated into the drilling device. LWD systems are typically a part of the bottom hole assembly, which is the lower portion of a drill string that provides force for the drill bit to break soil. LWD systems deliver real-time measurements for updating reservoir models and avoiding drilling problems. The timely data that LWD systems provide can guide well placement so that a wellbore remains within the most productive portion of a reservoir. With the benefits that LWD systems provide, drilling to extended reach reservoirs and horizontal wells becomes easier, especially in highly variable shale reservoirs.

Electromagnetic (EM) LWD systems use EM waves to measure the land formation properties around a drilling device. Typically, EM LWD systems consists of at least one transmitter and at least one receiver. The transmitter excites an EM field in the formation around the system that is subsequently measured by the receiver. The received measurements are useful for evaluating formation parameters, such as resistivity, permeability, and distance to a boundary. Continuing development of the oil industry leads to increasing numbers of horizontal wells being drilled. The drilling of horizontal wells requires the real-time detection of formation boundaries ahead of and around the drilling device. EM LWD systems are capable of providing this real-time detection, but currently available EM LWD systems do not have the efficiency and accuracy required to meet industry expectations.

SUMMARY OF THE INVENTION

The present invention describes a look ahead and look around EM LWD system with at least one transmitter and at least one receiver. In one embodiment, the present invention comprises of at least one transmitter and two receivers, with the transmitter located between the two receivers. In another embodiment, the present invention comprises of at least two transmitters and one receiver, with the receiver located between the two transmitters. In another embodiment, the present invention comprises of at least one transmitter and one receiver with the centers of the transmitter and the receiver being located in the same long axle position.

When the system is in a homogeneous medium with different resistivity, the receiver measures the same or similar responses from the transmitter. In one embodiment, the receivers are located on both sides of a transmitter. When formation boundaries exist, the receiver measures responses that correlate with both the relative position between the formation boundaries and the resistivity contrasts on the different sides of the boundaries.

In one embodiment, the present invention provides an EM LWD system that comprises of one magnetic antenna transmitter, containing one or multiple closed loops regarded as one or multiple magnetic dipoles, and one electric antenna receiver, which is an antenna or sensor that measures an electric field directly, with the center of the electric antenna receiver located at the center of the magnetic antenna transmitter, or with the electric antenna receiver located on a plane formed by the normal line of the magnetic antenna transmitter and the borehole axis. In this embodiment of the present invention, the boundary positions and formation resistivity is given by the measurement, V($\varphi$), or by the ratio of the measurement with rotation angle (V($\varphi$)) and the average of the measurements (average (V($\varphi$))), that is $$\frac{V(\varphi)}{\text{average}(V(\varphi))},$$

wherein $\varphi$ is tool's rotation angle.

In another embodiment, the present invention provides an EM LWD system that comprises of one magnetic antenna transmitter, containing one or multiple closed loops regarded as one or multiple magnetic dipoles, and one antenna receiver, which includes two connected antenna parts, which are both magnetic or electric or magnetic-electric. The magnetic antenna transmitter is located between the two connected antenna parts. In this embodiment of the present invention, the boundary positions and formation resistivity is given by the measurement, V($\varphi$), or by the ratio of the measurement with rotation angle (V($\varphi$)) and the average of the measurements (average (V($\varphi$))), that is $$\frac{V(\varphi)}{\text{average}(V(\varphi))},$$

In another embodiment, the present invention provides an EM LWD system that comprises of one magnetic antenna transmitter, containing one or multiple closed loops regarded as one or multiple magnetic dipoles, and one magnetic-electric antenna receiver, which is an antenna or sensor that measures magnetic field and electric field, at same time, with the magnetic-electric antenna receiver located at above or below the magnetic antenna transmitter. In this embodiment of the present invention, the boundary positions and formation resistivity is given by the measurement, V($\varphi$), or by the ratio of the measurement with rotation angle (V($\varphi$)) and the average of the measurements (average (V($\varphi$))), that is $$\frac{V(\varphi)}{\text{average}(V(\varphi))}.$$

In another embodiment, the present invention provides an EM LWD system that comprises of one magnetic antenna transmitter, containing one or multiple closed loops regarded as one or multiple magnetic dipoles, and one magnetic-electric antenna receiver, which is an antenna or sensor that measures magnetic field and electric field, at same time. The magnetic-electric antenna receiver includes two connected antenna parts, which are magnetic-electric. The magnetic antenna transmitter is located between the two connected antenna parts. In this embodiment of the present invention, the boundary positions and formation resistivity is given by the measurement, V(φ), or by the ratio of the measurement with rotation angle (V(φ)) and the average of the measurements (average(V(φ))), that is $$\frac{V(\varphi)}{\text{average}(V(\varphi))}.$$

In another embodiment, the present invention is an EM LWD system that comprises of one magnetic antenna transmitter and two antenna receivers, which are both magnetic or electric or magnetic-electric, with the magnetic antenna transmitter located between the two antenna receivers. In this embodiment of the present invention, the boundary positions, trends, and formation resistivity in both sides of the boundaries are given by the measurement, V(φ)), or by one or several ratios:

$$\frac{V(\varphi)}{\text{average}(V(\varphi))}, \frac{V^1(\varphi)}{V^2(\varphi)}, \frac{V^2(\varphi)}{V^1(\varphi)}, \frac{V^1(\varphi)-V^2(\varphi)}{V^1(\varphi)+V^2(\varphi)},$$

$$\frac{V^1(\varphi)-V^2(\varphi)}{V^2(\varphi)} \text{ and } \frac{V^1(\varphi)-V^2(\varphi)}{V^1(\varphi)},$$

including real part, imaginary part, amplitude and phase. $V^1(\varphi)$ and $V^2(\varphi)$ are measurements of two receivers with respect to the rotation angel φ. V(φ) is the total response of receivers, $V(\varphi)=V^1(\varphi)-V^2(\varphi)$, or $V(\varphi)=V^1(\varphi)+V^2(\varphi)$, and average(V(φ)) is the average of the V(φ).

In another embodiment, the present invention is an EM LWD system that comprises of one electric antenna transmitter and one antenna receiver, which includes two connected electric or magnetic or magnetic-electric antenna parts, or two antenna receivers, which are both electric or magnetic or magnetic-electric, with the electric antenna transmitter located between the two antenna parts or two antenna receivers.

In another embodiment, the present invention is an EM LWD system that comprises of one magnetic-electric antenna transmitter and one antenna receiver, which includes two connected electric or magnetic or magnetic-electric antenna parts, or two antenna receivers, which can be electric or magnetic or magnetic-electric, with the magnetic-electric antenna transmitter located between the two antenna parts or two antenna receivers.

In another embodiment, the present invention is an EM LWD system including magnetic-electric antenna as transmitter or/and receiver. In one embodiment, the magnetic-electric antenna can be regarded as a combination of a closed loop coil and a straight-line electric antenna.

BRIEF DESCRIPTION OF THE DRAWINGS

A better understanding of the invention can be obtained from the following detailed description of various disclosed embodiments.

The drawings and following detail descriptions are examples to help understand the present invention which is susceptible to various modifications and alternative forms. However, the drawings and detailed description thereof are not intended to limit the scope of the claims.

DETAILED DESCRIPTION OF THE DRAWINGS

As used herein, "magnetic antenna" refers to a coil loop that can be simplified as magnetic dipole.

As used herein, "magnetic antenna transmitter" refers to a magnetic antenna used as a transmitter that can emit electromagnetic waves into the formation around it when power is added to it.

As used herein, "magnetic antenna receiver" refers to a magnetic antenna used as a receiver that can measure electromagnetic waves around it.

As used herein, "electric antenna" refers to an electric dipole or an equivalent electric dipole.

As used herein, "electric antenna transmitter" refers to an electric dipole used as a transmitter that can emit electromagnetic waves into the formation around it.

As used herein, "electric antenna receiver" refers to an electric antenna used as a receiver that can measure electromagnetic waves around it.

As used herein, "magnetic-electric antenna" refers to an open wire which can be regarded as a combination of a magnetic antenna and an electric antenna or an equivalent combination of a magnetic dipole and an electric dipole.

As used herein, "magnetic-electric antenna transmitter" refers to a magnetic-electric antenna used as a transmitter that can emit electromagnetic waves into the formation around it.

As used herein, "magnetic-electric antenna receiver" refers to a magnetic-electric antenna used as a receiver that can measure electromagnetic waves around it.

Figure 1A:
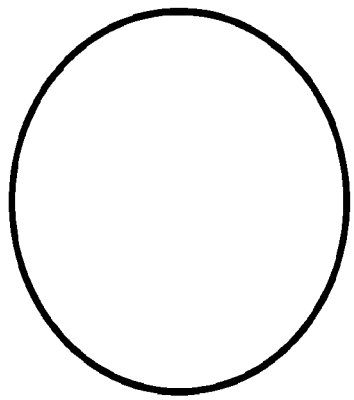
FIG. 1(a)-(d) show the profile of different kinds of coil antennas used in EM LWD systems.
Figure 1B:
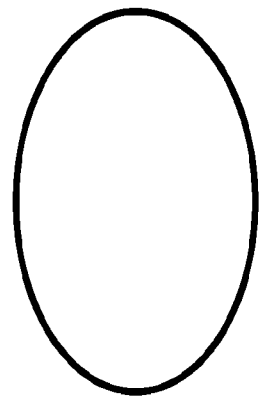
Figure 1C:
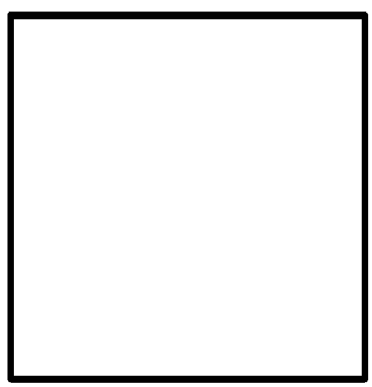
Figure 1D:
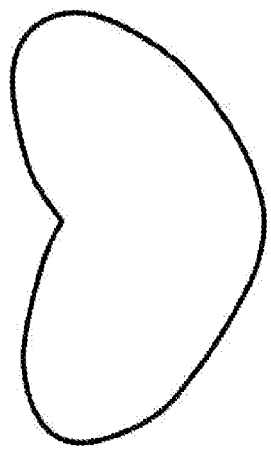

FIG. 1(a)-(d) show several different coil antennas used for electromagnetic (EM) LWD tools and wire line tools. FIG. 1(a) shows a circle loop antenna; FIG. 1(b) shows an elliptical loop antenna; FIG. 1(c) shows a rectangular loop antenna; FIG. 1(d) shows a bent antenna, which can be a circle loop, elliptical loop, or rectangular loop antenna with a bend in it. In theoretical analysis and interpolation, a closed loop antenna like those described above acts as a simple magnetic dipole, or a combination of several magnetic dipoles.

In the present invention, a closed loop antenna is referred to as a magnetic antenna. The magnetic antenna has two characteristics: it contains one or more closed loop coil antennas; and it can be simplified as one or several magnetic dipoles when analyzed in a simulation or interpolation. The magnetic antennas can act as both transmitters and receivers. In the following description, circle loop antennas are used to serve as an example, but the present invention is not limited to only circle loop antennas.

Corresponding to the magnetic antenna, an electric antenna is defined as a kind of antenna or sensor, which sends or receives signals by directly exciting or measuring an electric field. An electric antenna can act as a transmitter or a receiver.

In contrast to the magnetic antenna and the electric antenna, a magnetic-electric antenna is defined as a kind of antenna or sensor that is an opened wire and can be regarded as a combination of a magnetic antenna and an electric antenna and works as a magnetic antenna and an electric antenna at the same time. A magnetic-electric antenna can act as a transmitter or a receiver.

Figure 2A:
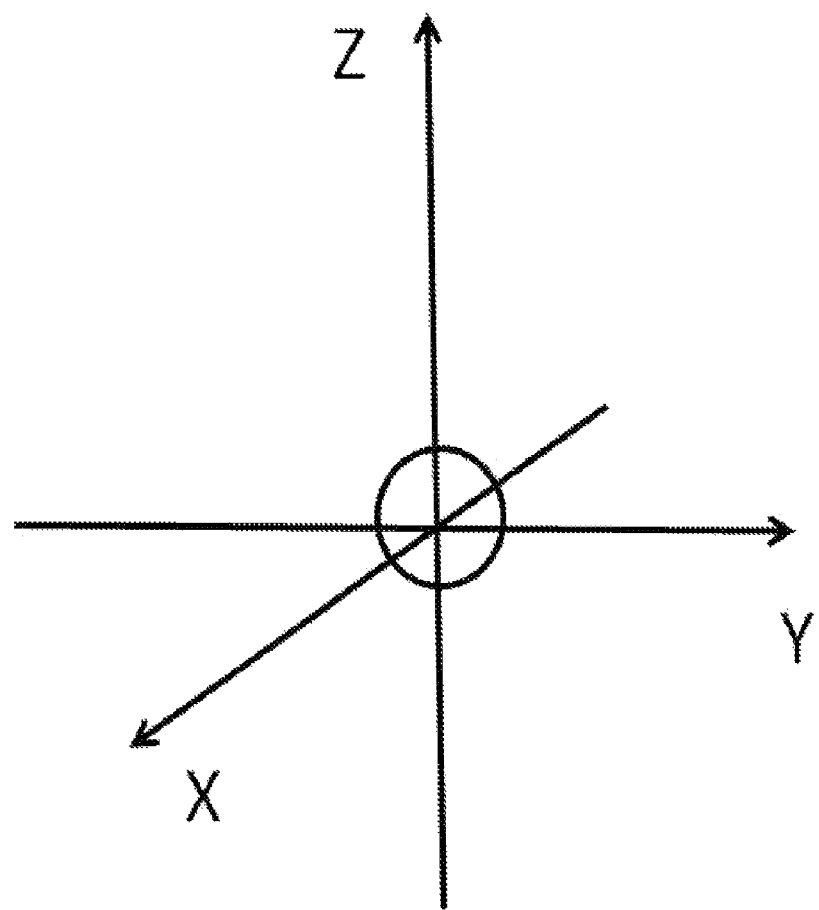
FIG. 2(a)-(c) show the profile of a circular coil antenna oriented in horizontal and vertical positions.

FIG. 2(a)-(d) show circle loop antennas in a Cartesian coordinate system. FIG. 2(a) shows a X-directional magnetic antenna, which is an antenna with the normal direction in the X direction. When the X-directional magnetic antenna is used as a transmitter and emits EM waves into a formation, it excites an EM field in the formation around it. When the receiver is an electric antenna, the EM field can be simplified to an electric (E) field. At the receiver location, the E field strength can be expressed as a vector ($E_{xx}$, $E_{xy}$, $E_{xz}$), where E signifies the E field, and the first subscript, x, signifies the transmitter direction. It is x because the X-directional magnetic antenna has its normal direction in the X direction. The second subscript is the measurement direction. The measurements of the E field strength can be converted into voltage and expressed as ($V_{mexx}$, $V_{mexy}$, $V_{mexz}$), where V signifies voltage, and the first subscript, m, signifies the transmitter antenna is magnetic, and the second subscript, e, signifies the E field measured by the electric antenna receiver. If the receiver is a magnetic antenna, the magnetic field is considered instead of the E field, and the EM field at the receiver location can be expressed as a magnetic vector ($H_{xx}$, $H_{xy}$, $H_{xz}$), where H signifies a magnetic field. Each of the three directional components can be measured by magnetic antennas oriented in the X, Y, and Z directions. In the same way as in an E field, the measurements from magnetic antennas can be expressed as a voltage vector ($V_{mmxx}$, $V_{mmxy}$, $V_{mmxz}$), where the first subscript, m, signifies magnetic antenna transmitter, and the second, m, signifies magnetic antenna receiver. If the receiver is a magnetic-electric antenna, the magnetic field and electric field are considered, at the same time, and the EM field at the receiver location can be expressed as a magnetic vector ($H_{xx}$, $H_{xy}$, $H_{xz}$) and an electric vector ($E_{xx}$, $E_{xy}$, $E_{xz}$). The six components of the two vectors can be measured by the magnetic-electric receiver and the measurement can be expressed as a voltage vector ($V_{mmxx}+V_{mexx}$, $V_{mmxy}+V_{mexy}$, $V_{mmxz}+V_{mexz}$).

Figure 2B:
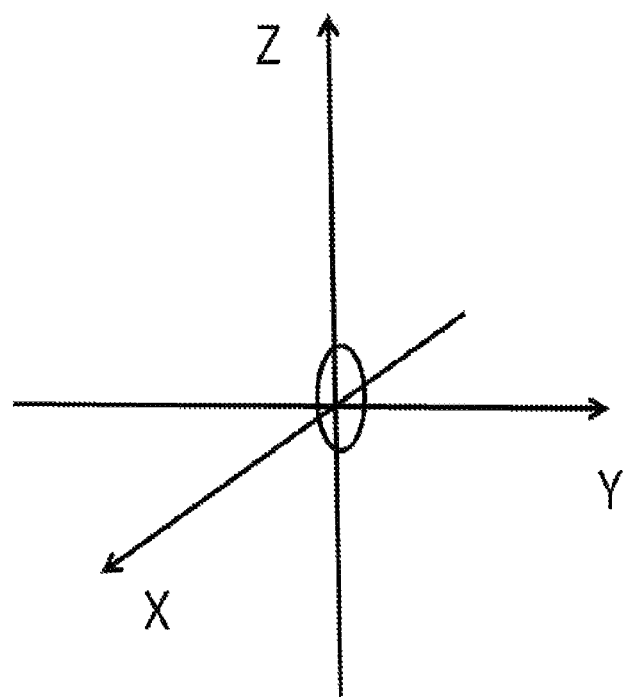

FIG. 2(b) shows a Y-directional magnetic antenna, which is an antenna with the normal direction in the Y direction. Similar to the antenna described in FIG. 2(a), when the Y-directional magnetic antenna serves as a transmitter, the E field at the electric receiver location can be expressed as a vector ($E_{yx}$, $E_{yy}$, $E_{yz}$). The measurements of the E field can be converted to voltage and expressed as ($V_{meyx}$, $V_{meyy}$, $V_{meyz}$). When the receiver is a magnetic receiver, the magnetic field is considered and expressed as a vector ($H_{yx}$, $H_{yy}$, $H_{yz}$). The measurements of the magnetic field can be expressed as a voltage vector ($V_{mmyx}$, $V_{mmyy}$, $V_{mmyz}$). When the receiver is a magnetic-electric antenna, the EM field is considered and expressed as a vector ($H_{yx}$, $H_{yy}$, $H_{yz}$) and a vector ($E_{yx}$, $E_{yy}$, $E_{yz}$). The measurement can be expressed as a voltage vector ($V_{mmyx}+V_{meyx}$, $V_{mmyy}+V_{meyy}$, $V_{mmyz}+V_{meyz}$).

Figure 2C:
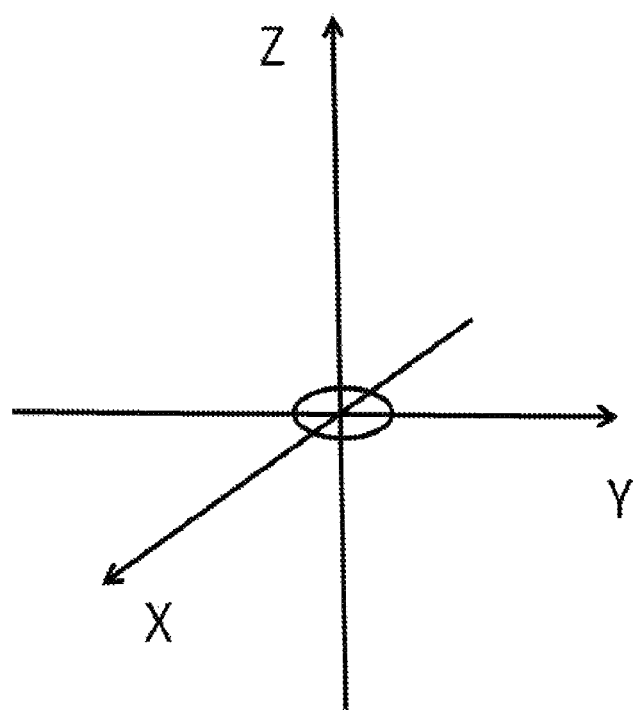

FIG. 2(c) shows a Z-directional magnetic antenna, which is an antenna with the normal direction in the Z direction. Similar to the antennas shown in FIG. 2(a) and FIG. 2(b), when the Z-directional magnetic antenna serves as a transmitter, the E field at the electric receiver location can be expressed as a vector ($E_{zx}$, $E_{zy}$, $E_{zz}$). The measurements of the E field can be converted to a voltage vector ($V_{mezx}$, $V_{mezy}$, $V_{mezz}$). When the receiver is a magnetic receiver, the magnetic field is considered and expressed as a vector ($H_{xx}$, $H_{zy}$, $H_{zz}$). The measurements of the magnetic field can be expressed as a voltage vector ($V_{mmzx}$, $V_{mmzy}$, $V_{mmzz}$). When the receiver is a magnetic-electric receiver, the EM field is considered and expressed as a vector ($H_{zx}$, $H_{zy}$, $H_{zz}$) and a vector ($E_{zx}$, $E_{zy}$, $E_{zz}$) The measurement can be expressed as a voltage vector ($V_{mmzx}+V_{mezx}$, $V_{mmzy}+V_{mezy}$, $V_{mmzz}+V_{mezz}$).

Any kind of magnetic antenna used by the current industry can be expressed as a combination of the above three antennas. The purpose of defining the aforementioned antennas is to help describe the present invention, and not to serve as limitations on the present invention.

Figure 3A:
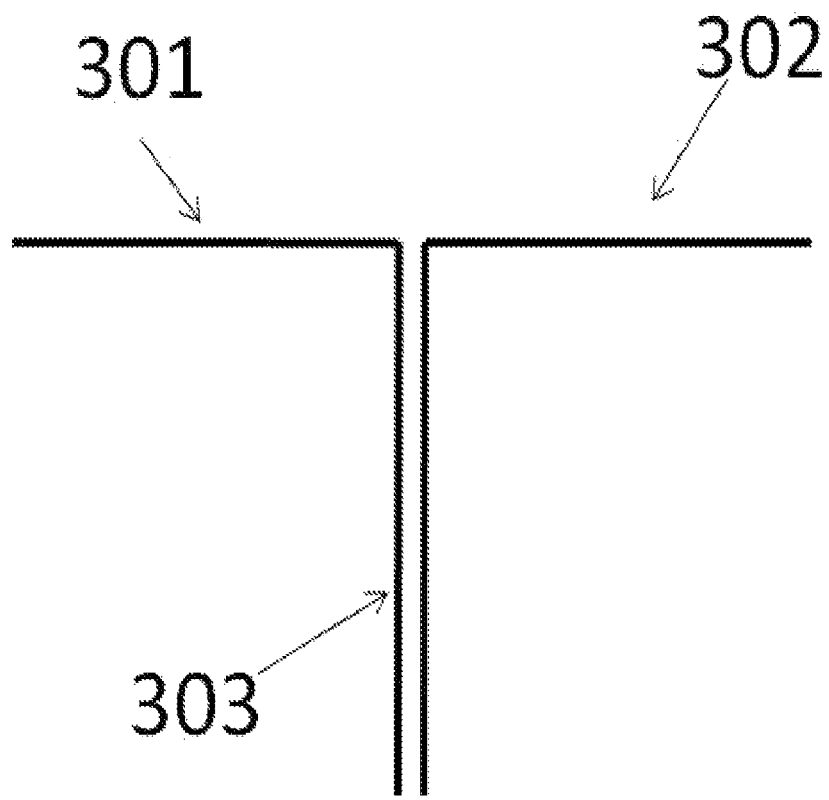
FIG. 3(a) shows an electrode antenna capable of measuring an electric field.

FIG. 3(a) shows an example of electric antenna capable of measuring an electric field. Electrode1 301 and electrode2 302 are two electrodes on the antenna. The two electrodes are connected with a transmission line 303 that is connected to an electronic device. Such an electronic device includes, but is not limited to, an electronic board that can record measurements.

Figure 3B:
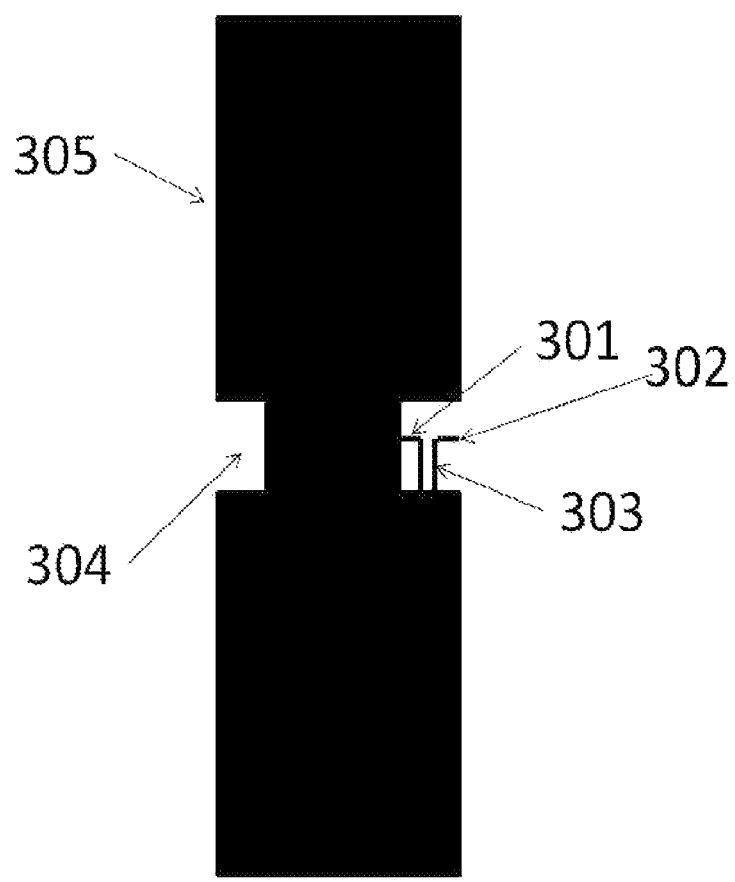
FIG. 3(b) shows an electrode antenna as shown in FIG. 3(a) located on one side of a collar of a conductive mandrel.

FIG. 3(b) shows an electric antenna as shown in FIG. 3(a) mounted on one side of a collar 304 of a conductive mandrel 305. The transmission line connecting the two electrodes is buried inside of the mandrel and connected to an electronic device.

Figure 3C:
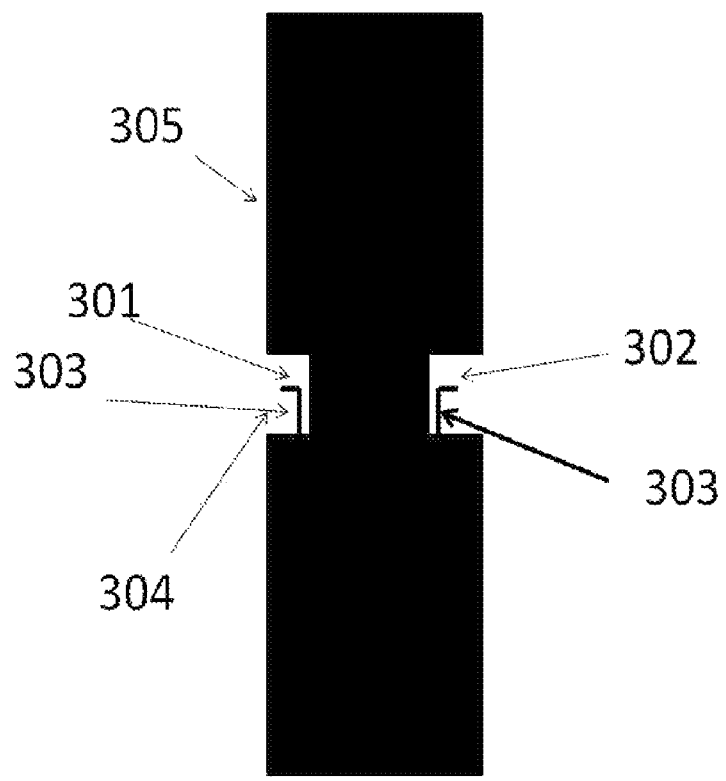
FIG. 3(c) shows an electrode antenna as shown in FIG. 3(a) located on a collar of a conductive mandrel, with electrode1 and electrode2 of the electrode antenna on opposite sides of the collar.

FIG. 3(c) shows an electric antenna as shown in FIG. 3(a) mounted on a collar 304 of a conductive mandrel 305. The two electrodes 301, 302 of the electric antenna are separated and located on opposite sides of the collar 304 of the conductive mandrel 305. The transmission line 303 connecting the two electrodes 301, 302 is buried inside of the mandrel and connected to an electronic device.

Figure 4:
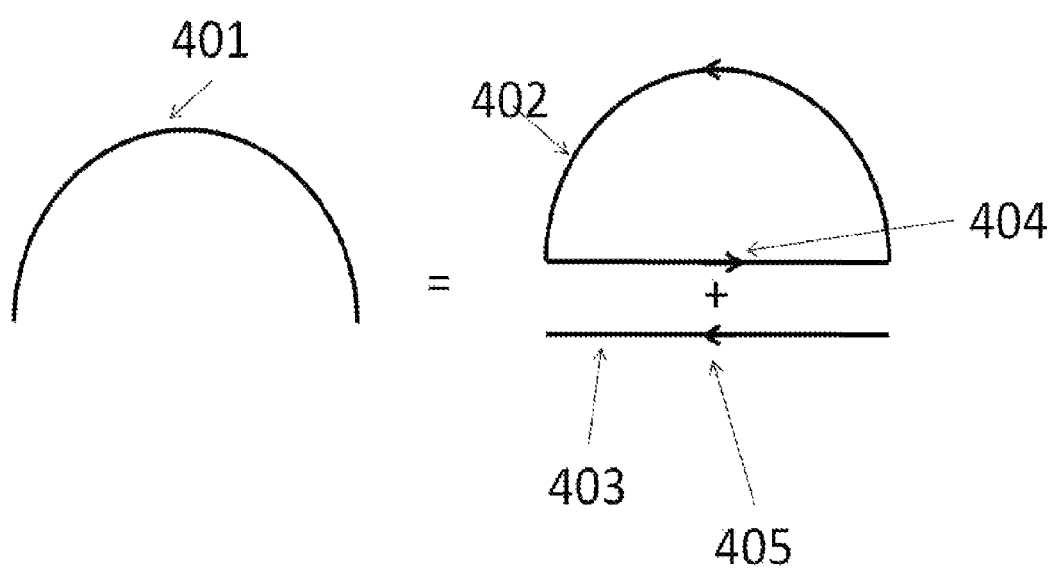
FIG. 4 shows the profile of a magnetic-electric antenna capable of measuring a combination of a magnetic field and an electric field at the same time.

FIG. 4 shows a magnetic-electric antenna capable of measuring a magnetic field and an electric field at the same time. The left side is half circle antenna 401 which can be regarded as an example of a magnetic-electric antenna. The half circle antenna can be regarded as a combination of a magnetic antenna 402, the upper one on the left side, and an electric antenna 403, the lower one on the left side. The direction 405 of the electric antenna 403 is against the direction 404 of the bottom side of the magnetic antenna 402. The length of the electric antenna 403 is same as the diameter of the half circle antenna 401. The half circle is an example of a magnetic-electric antenna and does not limit the present invention.

Figure 5A:
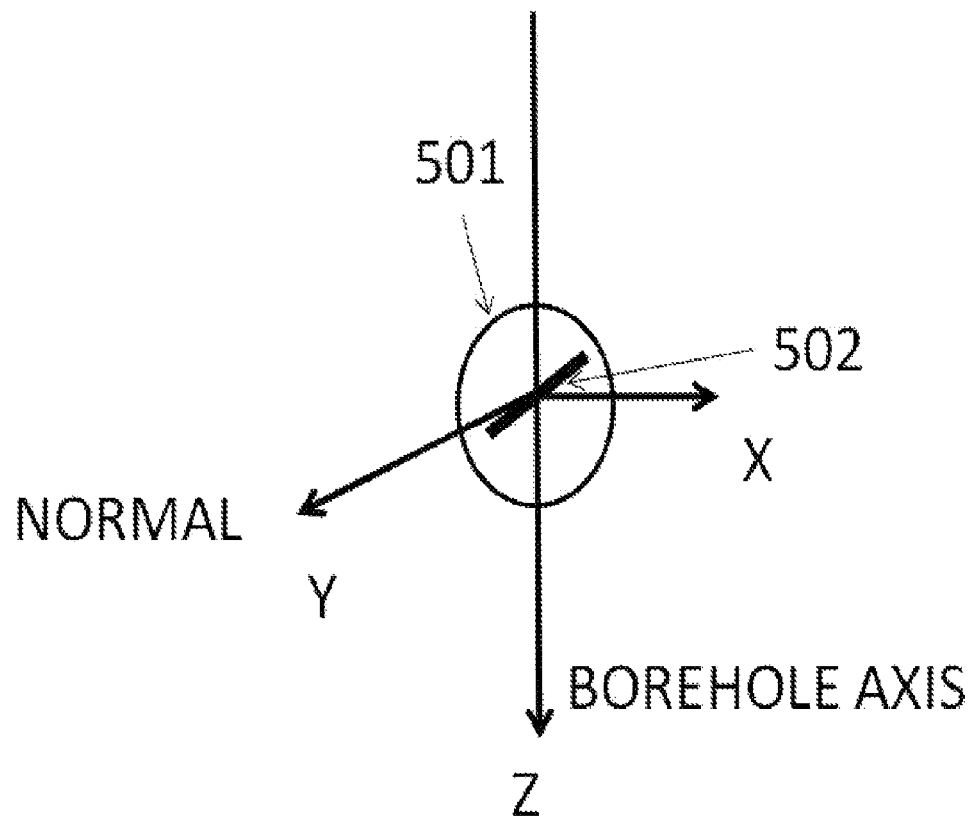
FIG. 5(a) shows the configuration of an EM LWD system comprising of one Y-directional transmitter, and one electric dipole receiver. The receiver is an electrical sensor. The centers of the transmitter and the receiver lie in the same position along an axle in a LWD system.

FIG. 5(a) shows a transmitter-receiver system that includes a Y-directional magnetic antenna 501 as the transmitter and an electric antenna 502 as the receiver. The center of the electric antenna 502 is located at the center of the Y-directional magnetic antenna 501. This system cannot receive a signal in a homogeneous formation. The system only receives EM waves reflected by the formation boundary ahead of or around the system.

Figure 5B:
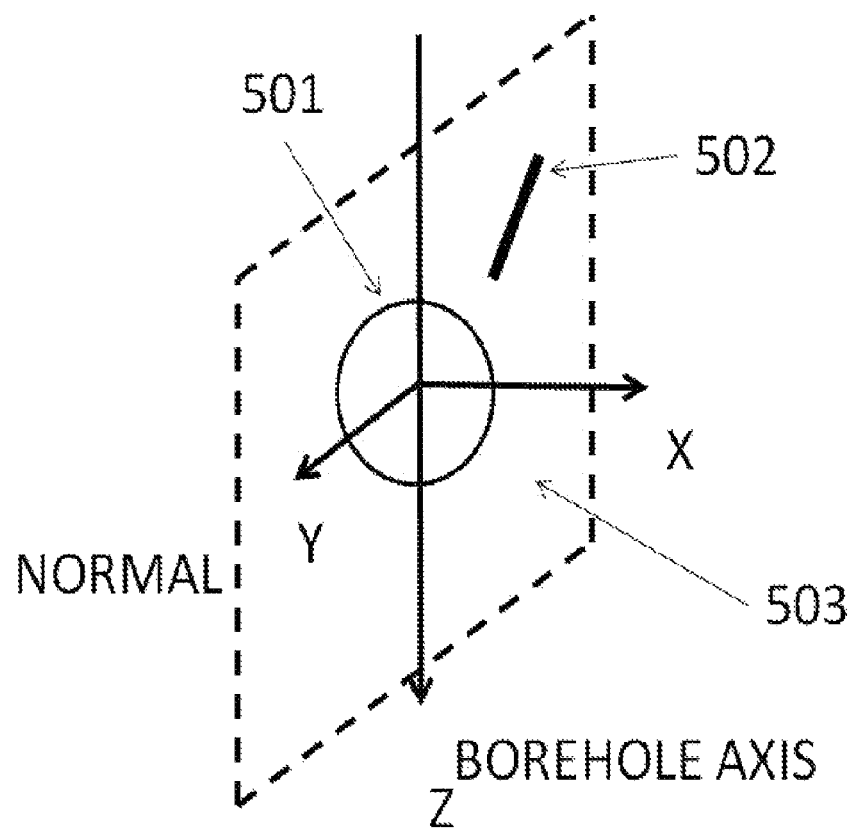
FIG. 5(b) shows the configuration of an EM LWD system comprising one Y-directional transmitter, and one electric dipole receiver. The electric antenna is located on a plane which is formed by the borehole axis and the normal line of the magnetic antenna. The normal line passes through the center of the magnetic antenna.

FIG. 5(b) shows a transmitter-receiver system that includes a Y-directional magnetic antenna 501 as the transmitter and an electric antenna 502 as the receiver. The electric antenna is located on a plane 503 which is formed by borehole axis and normal line of the magnetic antenna transmitter 501, and the normal line passes the center of the magnetic antenna. This system cannot receive a signal in a homogeneous formation. The system only receives EM waves reflected by the formation boundary ahead of or around the system.

Figure 6A:
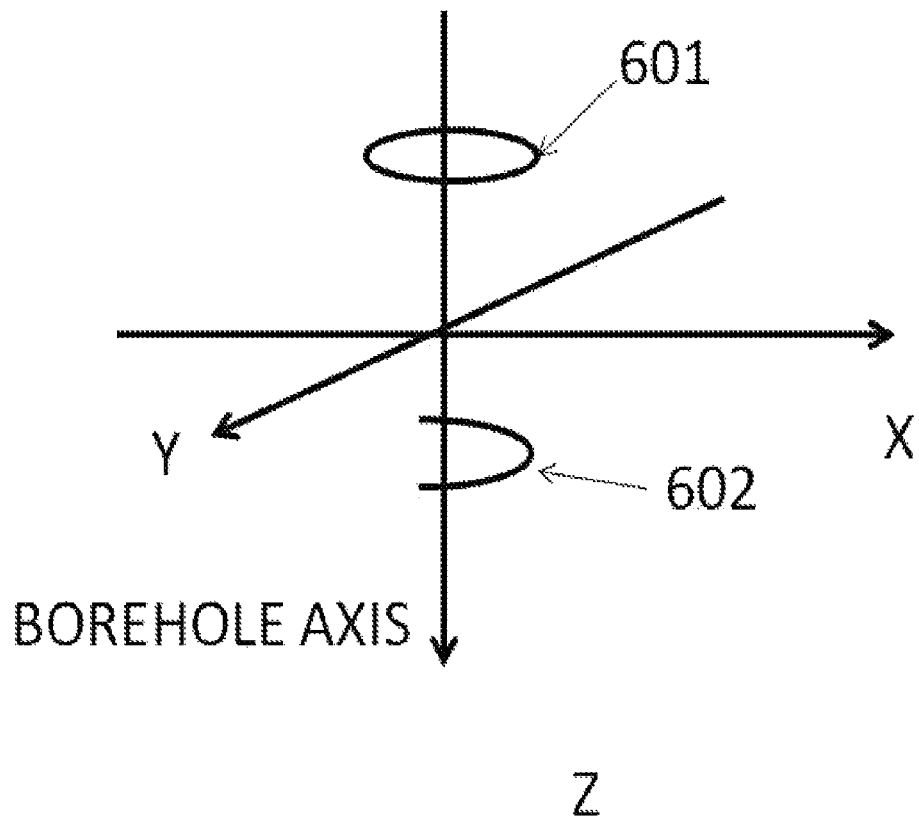
FIG. 6(a) shows the configuration of an EM LWD system comprising one transmitter and one receiver. The transmitter is a coil antenna, and the receiver is a magnetic-electric antenna.

FIG. 6(a) shows a transmitter-receiver system that includes a Z-directional magnetic antenna 601 as the transmitter and a magnetic-electric antenna 602 as the receiver in which the magnetic antenna part (such as 402) is Z-directional magnetic antenna and the electric antenna part (such as 403) is Y-directional antenna which means the electric antenna along Y-direction. The measurement of the system can be expressed as $$V(\varphi) = V_{mmzz} + V_{mezx} \sin\varphi + V_{mezy} \cos\varphi$$

where $\varphi$ is the tool rotation angle.

Figure 6B:
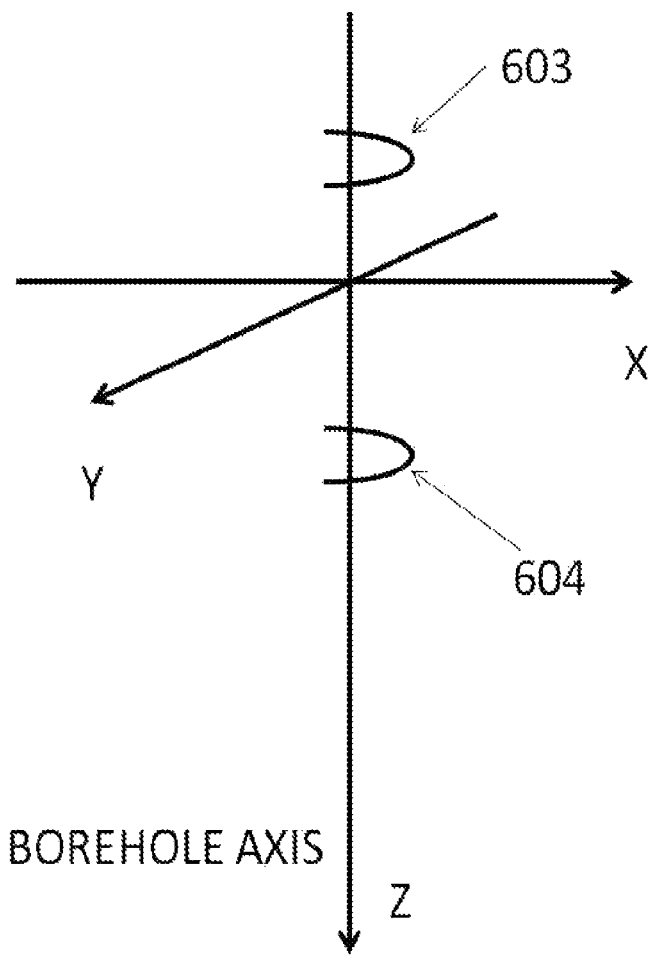
FIG. 6(b) shows the configuration of an EM LWD system comprising of one transmitter and one receiver. The transmitter is a magnetic-electric antenna. The receiver is a magnetic-electric antenna.

FIG. 6(b) shows a transmitter-receiver system that includes a magnetic-electric antenna 603 as the transmitter and a magnetic-electric antenna 604 as the receiver. Both antennae are combinations of a Z-directional magnetic antenna and the electric antenna along Y-directional. The measurement of the system can be expressed as $$V(\varphi) = V_{mmzz} + V_{mezy}\sin\varphi + V_{mezx}\cos\varphi + V_{emyz}\sin\varphi + V_{emxz}\cos\varphi + \frac{V_{eeyy}+V_{eexx}}{2} + \frac{V_{eeyy}-V_{eexx}}{2}\cos2\varphi$$

FIG. 7(a)-(d) show transmitter-receiver systems that include one Y-direction magnetic antenna transmitter 701 and one receiver. The receiver is composed of two parts 702 and 703, 705 and 706, with the transmitter 701 positioned between the two parts 702 and 703, 705 and 706. Each part 702, 703 can be regarded as an electric antenna, as in FIG. 7(a)-(b), and a magnetic-electric antenna 705, 706, as in FIG. 7(c)-(d). If the two parts 702 and 703, 705 and 706 of the receiver are symmetrically positioned around the transmitter 701, and if the formation around the tool is homogeneous, the signal received by two receiver parts 702 and 703, 705 and 706 will cancel each other. As a result, the transmitter-receiver system will not receive an effective signal when it is around homogeneous formations. The system only receives effective signals if boundaries exist ahead of or around the system. These effective signals can be used to determine the relative position of the boundary and formation resistivity.

Figure 7A:
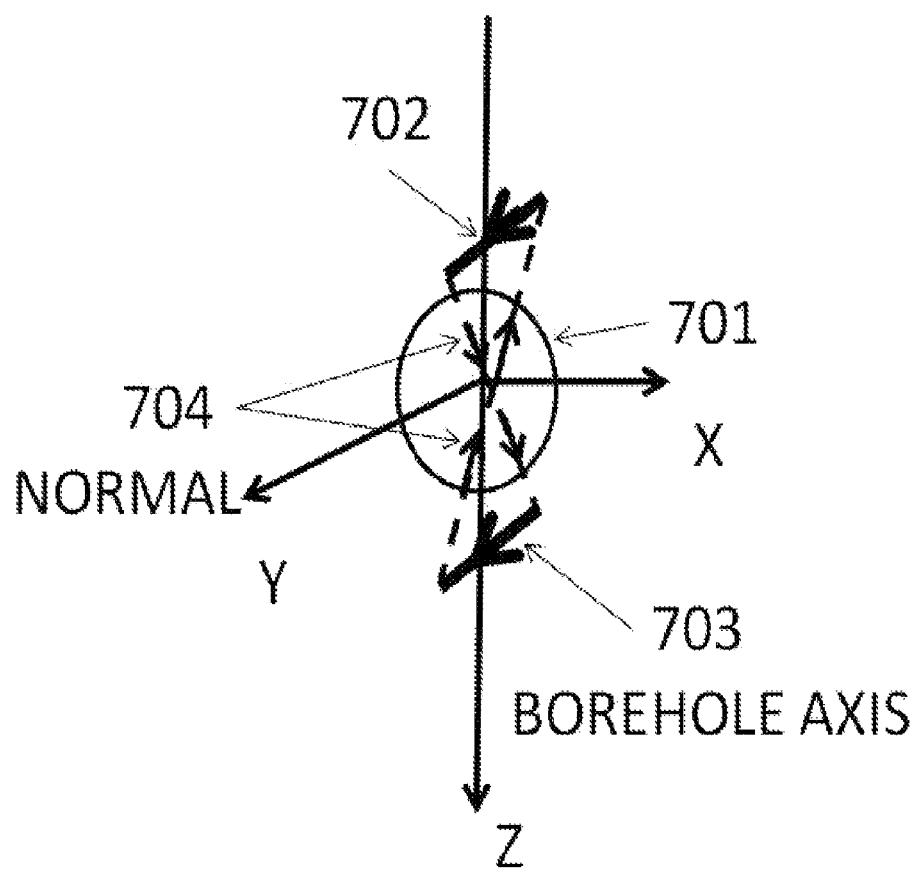
FIG. 7(a) shows the configuration of an EM LWD system comprising one transmitter and one receiver. The transmitter is a coil antenna, and the receiver is composed of two connected electric sensors located above and below the transmitter.

FIG. 7(a) shows that the two parts 702, 703 of the electric receiver, Reup 702 and Redn 703, are connected to each other with electrical lines 704 shown as dashed lines. The dashed line signify that the electrical lines do not contribute to the measurements, and signify that Reup 702 and Redn 703 are connected in series. Reup 702 and Redn 703 should point in the same direction. The direction can be arbitrary, in one embodiment, the direction is the X-direction in the Cartesian coordinate system. While the Y-directional magnetic antenna 701 emits EM waves into a formation around it, the receiver, Reup 702 and Redn 703, will receive the E field $E_{yx}^{up}$ and $E_{yx}^{dn}$ respectively. The received E field can be converted to voltage using $Veup=LE_{yx}^{up}$ and $Vmedn=LE_{yx}^{dn}$, where L is the length of the electric antenna. The measurement of the system can be expressed as:

$$V = Vmeup - Vmedn$$

If the two parts of the receiver 702, 703 are symmetrically positioned at both side of the Y-directional magnetic antenna 701 and the system is located in a homogeneous formation, then:

$$Vmeup = Vmedn$$

This provides the result: Vme=0

Figure 7B:
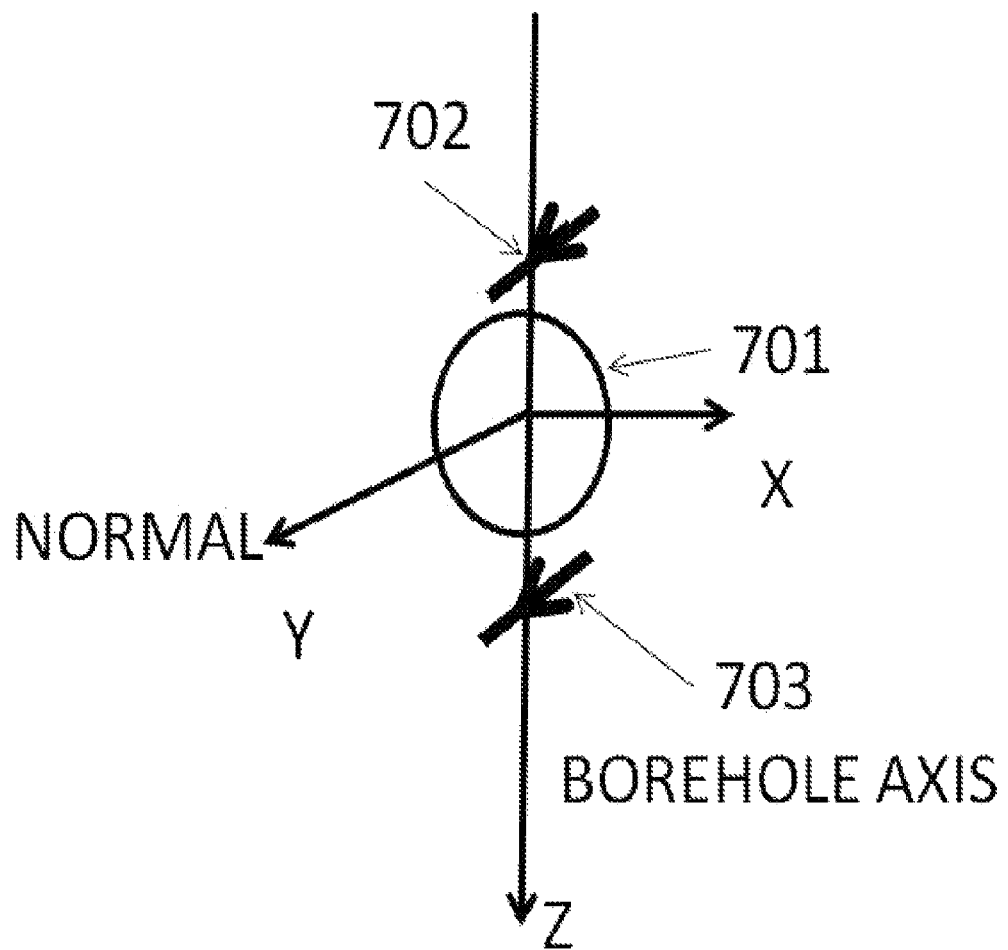
FIG. 7(b) shows the configuration of an EM LWD system comprising one transmitter and two receivers. The transmitter is a coil antenna. The two receivers are separate electric sensors located above and below the transmitter.

FIG. 7(b) shows two electric antenna receivers, Re1 702 and Re2 703, that are separated and point in the same direction. The direction can be arbitrary, in one embodiment, the direction is the X-direction in the Cartesian coordinate system. While the Y-directional magnetic antenna 701 emits EM waves into a formation around it, Re1 702 and Re2 703 will receive the E field $E_{yx}^{1}$ and $E_{yx}^{2}$, respectively. The received E field can be converted into voltage using $Ve1=LE_{yx}^{1}$, and $Ve2=LE_{yx}^{2}$. If the formation around the transmitter-receiver system is a homogeneous medium and Re1 702 and Re2 703 are symmetrically positioned on both sides of the Y-directional magnetic antenna 701, then:

$$Vme1 = -Vme2$$

This provides the result:

$$Vme1 + Vme2 = 0$$

Figure 7C:
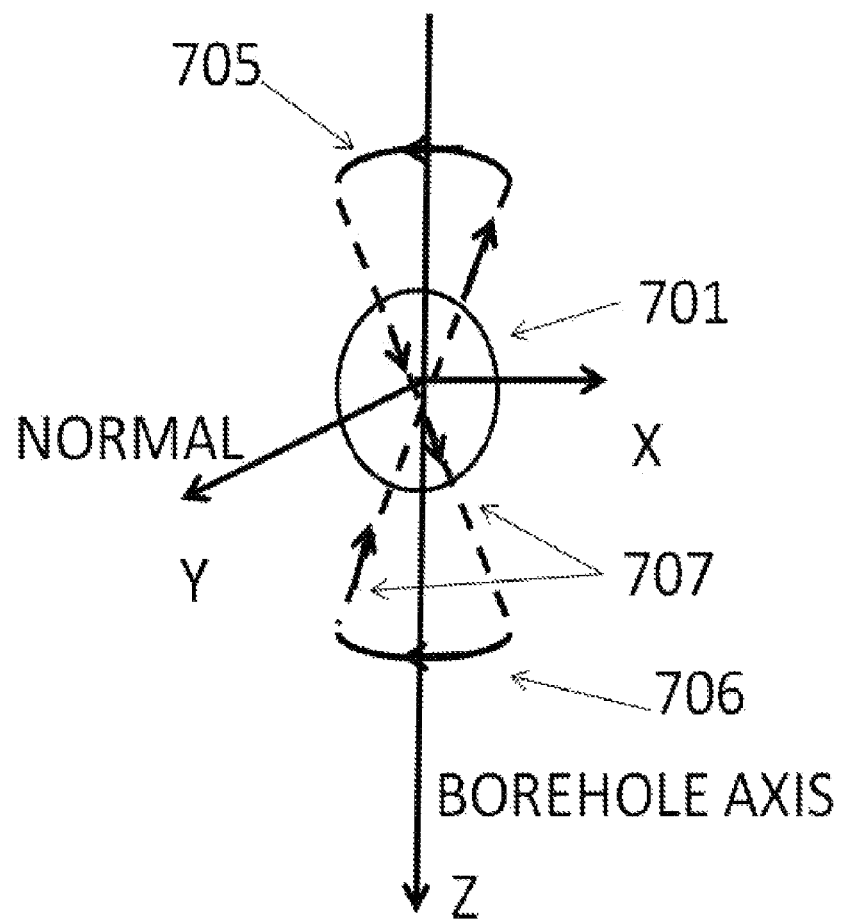
FIG. 7(c) shows the configuration of an EM LWD system comprising one transmitter and one receiver. The transmitter is a coil antenna, and the receiver is composed of two connected magnetic-electric sensors located above and below the transmitter.

FIG. 7(c) shows that the two parts 705, 706 of the magnetic-electric antenna receiver, Rmeup 705 and Rmedn 706, are connected to each other with electrical lines shown as dashed lines 707. The dashed line signify that the electrical lines 707 do not contribute to the measurements, and signify that Rmeup 705 and Rmedn 706 are connected in series. Rmeup 705 and Rmedn 706 should point in the same direction. The direction can be arbitrary, in one embodiment, the direction of electric part of the magnetic-electric antenna 705, 706 is the X-direction, and the magnetic antenna part of the magnetic-electric antenna 705, 706 is Z-directional antenna in the Cartesian coordinate system. While the Y-directional magnetic antenna 701 emits EM waves into a formation around it, the receiver, Rmeup 705 and Rmedn 706, will receive the H field $H_{yz}^{up}$ and $H_{yz}^{dn}$ and the E field $E_{yx}^{up}$ and $E_{yx}^{dn}$, respectively. The received H field and E field can be converted to voltage using $V_{mmyz}^{up}$ and $V_{mmyz}^{dn}$, and $V_{meyy}^{up}$ and $V_{meyy}^{dn}$. The measurement of the system can be expressed as:

$$V = V_{mmyz}^{up} - V_{mmyz}^{up} + V_{meyy}^{up} - V_{meyy}^{up}$$

If the two parts 705, 706 of the receiver are symmetrically positioned at both side of the Y-directional magnetic antenna 701, and the system is located in a homogeneous formation, then:

$$V_{mmyz}^{up} = V_{mmyz}^{up},$$

$$V_{meyy}^{up} = V_{meyy}^{up}$$

This provides the result: V=0

Figure 7D:
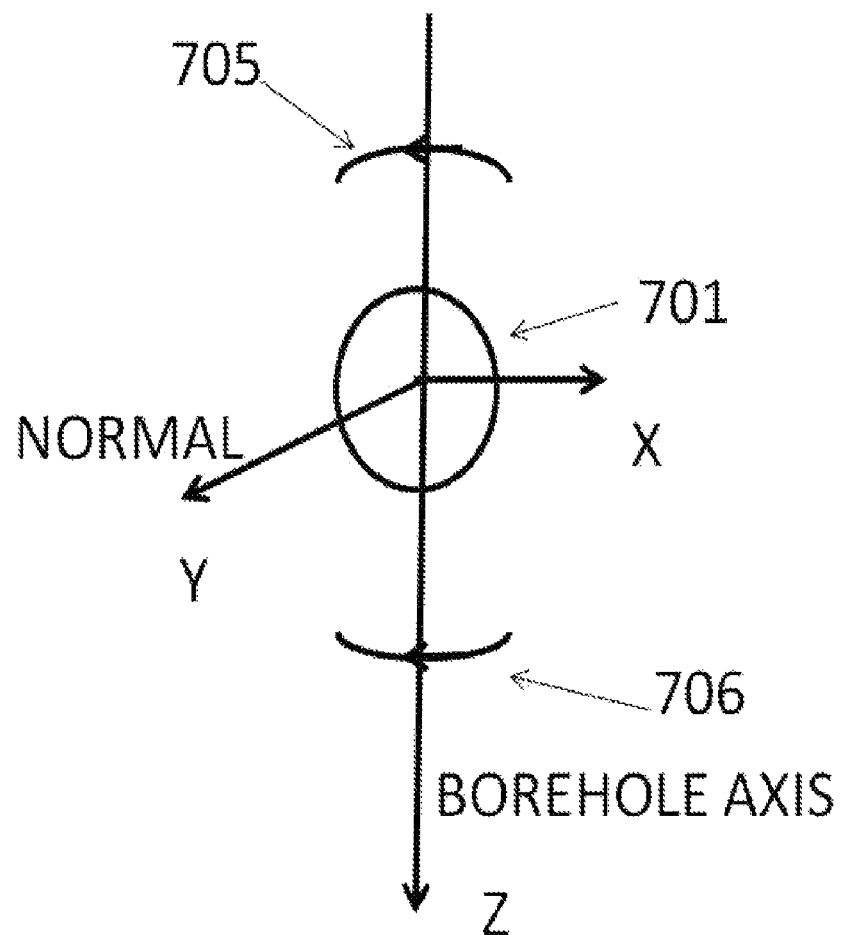
FIG. 7(d) shows the configuration of an EM LWD system comprising one transmitter and two receivers. The transmitter is a coil antenna. The two receivers are separate magnetic-electric sensors located above and below the transmitter.

FIG. 7(d) shows two magnetic-electric antenna receiver, Rme1 705 and Rme2 706, that are separated and point in the same direction. The direction can be arbitrary, in one embodiment, the direction of electric part of the magnetic-electric antenna 705, 706 is the X-direction, and the magnetic antenna part of the magnetic-electric antenna 705 706 is Z-directional antenna in the Cartesian coordinate system.

While the Y-directional magnetic antenna 701 emits EM waves into a formation around it, Rme1 705 and Rme2 706 will receive the H field $H_{yz}^{1}$ and $H_{yz}^{2}$ and the E field $E_{yx}^{1}$ and $E_{yx}^{2}$, respectively. The received H field and E field can be converted to voltage $V_{mmyz}^{1}$ and $V_{mmyz}^{2}$, and $V_{meyy}^{1}$ and $V_{meyy}^{2}$. If the two receiver 705, 706 are symmetrically positioned at both side of the Y-directional magnetic antenna 701, and the system is located in a homogeneous formation $$V_{mmyz}^{up} = -V_{mmyz}^{up},$$

$$V_{meyy}^{up} = -V_{meyy}^{up},$$

then the sum of two receivers' measurement is 0.

The antennas shown in FIG. 7(a)-(d) are Y-directional magnetic antennas 701, but they can be X-directional antennas or Z-directional antennas.

Figure 8A:
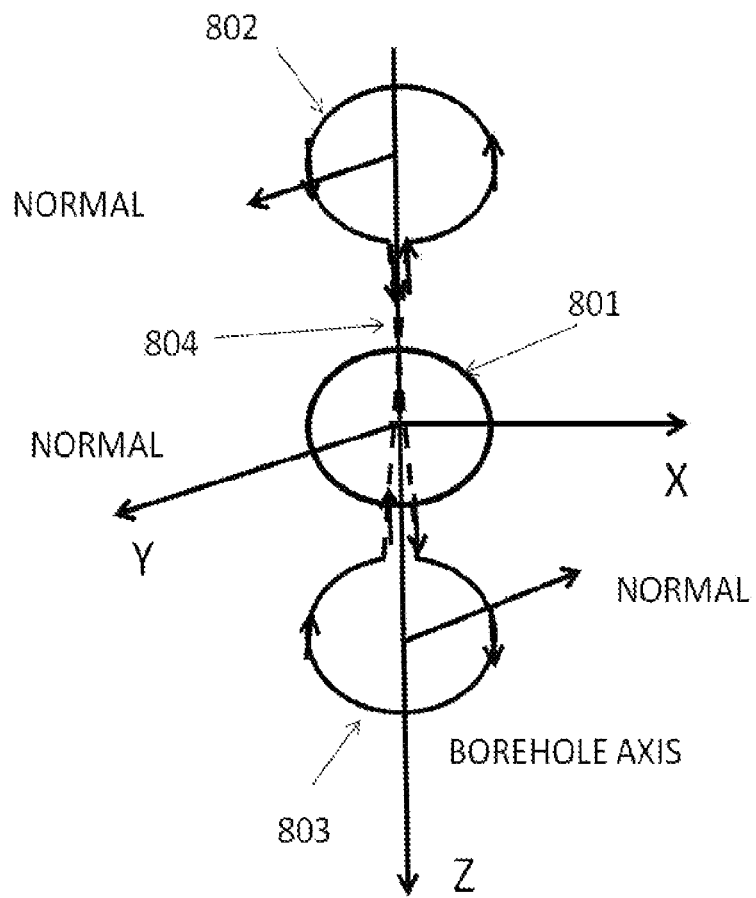
FIG. 8(a) shows the configuration of an EM LWD system comprising one transmitter and one receiver. The transmitter is a coil antenna. The receiver is a combination of two connected coil antennas located above and below the transmitter.
Figure 8B:
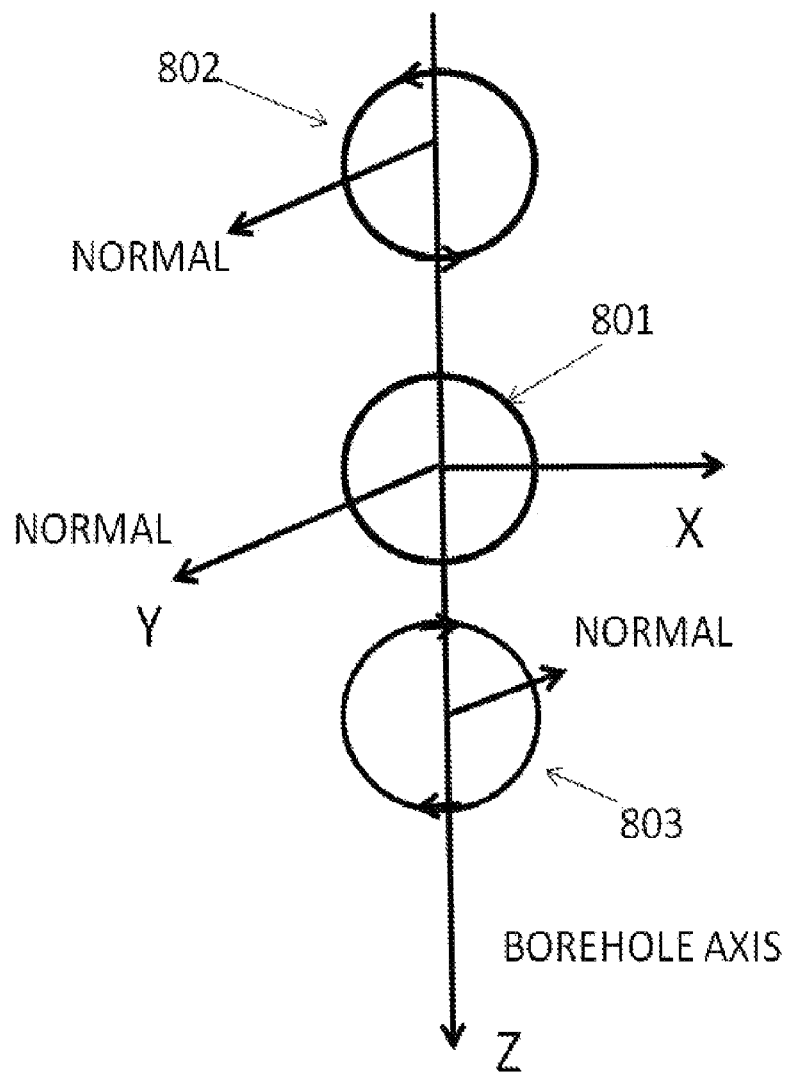
FIG. 8(b) shows the configuration of an EM LWD system comprising one transmitter and two receivers. The transmitter is a coil antenna. The two receivers are two separate coil antennas located above and below the transmitter.

FIG. 8(a)-(b) show transmitter-receiver systems in which a Y-directional magnetic antenna 801 is a transmitter, and a receiver includes two magnetic antenna parts 802, 803, with the transmitter 801 located between the two magnetic antenna parts 802, 803. As the transmitter emits EM waves into a formation, if the two parts 802, 803 of the receiver are symmetrically positioned on both sides of the Y-directional magnetic antenna 801, the receiver can measure the reflected EM waves from formation boundaries ahead of or around the system. Only reflected EM waves can be extracted from the signal measured by the receiver. Measurement of the reflected EM waves can be used to determine formation boundaries ahead of or around the system.

FIG. 8(a) shows a receiver with two magnetic antennas, Rmup 802 and Rmdn 803, that are connected to each other with electrical lines shown as dashed lines 804. The dashed lines mean that the electrical lines do not contribute to the measurements, and means that Rmup 802 and Rmdn 803 are connected in series. The normal direction of Rmup 802 points in the positive Y-direction, and the normal direction of Rmdn 803 points in the negative Y direction. As the Y-directional magnetic antenna transmitter 801 emits EM waves into a formation around it, Rmup 802 and Rmdn 803 measure the reflected signal, in this case, voltage. The measurement of the system can be expressed:

$$V = Vmup + Vmdn$$

If the formation around the transmitter-receiver system is a homogeneous medium, and the two parts 802, 803 of the receiver are symmetrically positioned on both sides of the Y-directional magnetic antenna transmitter 801, then:

$$Vmup = -Vmdn$$

This provides the result: V=0

FIG. 8(b) shows two magnetic antennae receivers, Rm1 802 and Rm2 803, located on both sides of a Y-directional magnetic antenna transmitter 801. The normal direction of Rm1 802 points in the positive Y-direction, and the normal direction of Rm2 803 points in the negative Y-direction. As the Y-directional magnetic antenna 801 emits EM waves into a formation around it, Rm1 802 and Rm2 803 measure the signal, in this case, voltage, Vm1 and Vm2, respectively. If the medium around the transmitter-receiver system is a homogeneous medium and the two receivers 802, 803 are symmetrically positioned on both sides of the Y-directional magnetic antenna 801, then:

$$Vm1 = -Vm2$$

This provides the result:

$$Vm1+Vm2=0$$

Figure 9A:
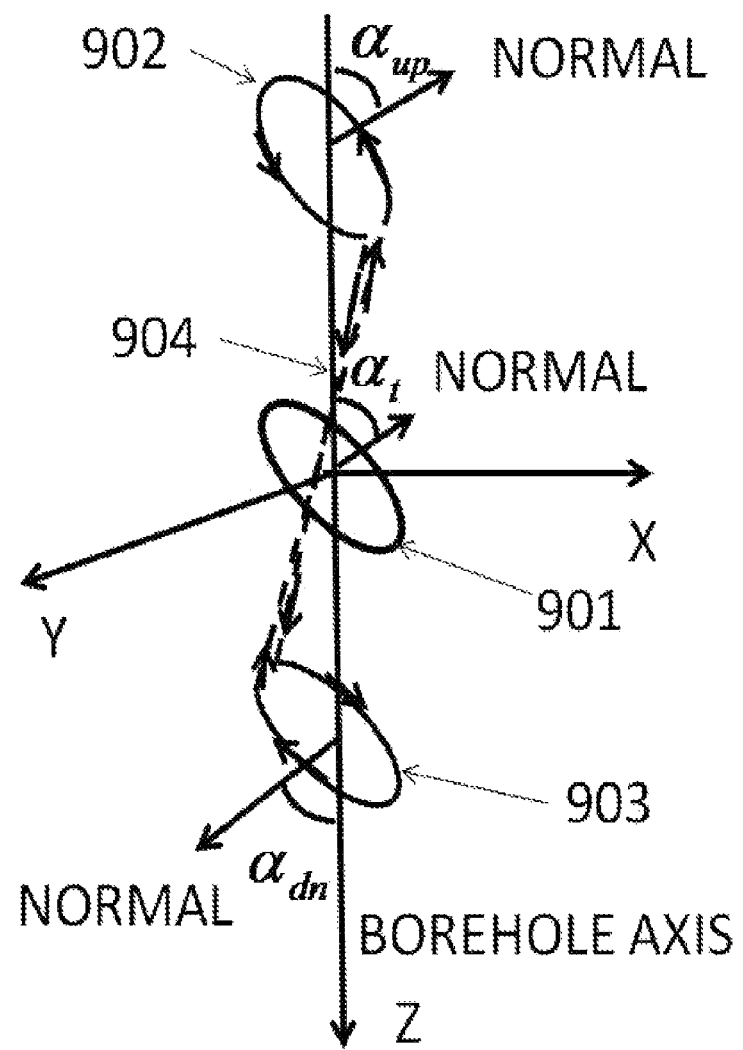
FIG. 9(a) shows the configuration of an EM LWD system comprising one transmitter and one receiver. The transmitter is a coil antenna oriented at a tilt. The receiver is a combination of two connected coils, both oriented at a tilt, located above and below the transmitter.
Figure 9B:
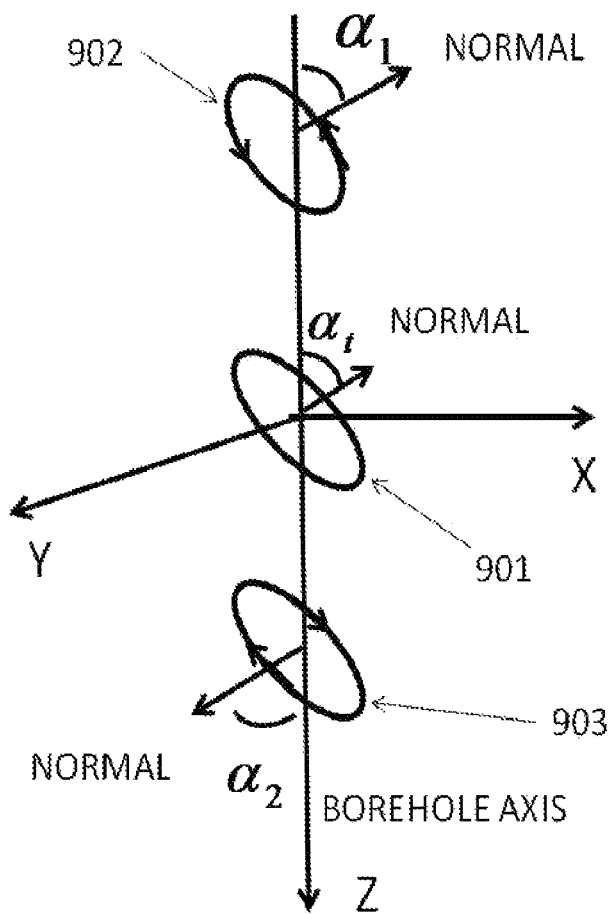
FIG. 9(b) shows the configuration of an EM LWD system comprising one transmitter and two receivers. The transmitter is a coil antenna oriented at a tilt. The two receivers are two separate coils, both oriented at a tilt, located above and below the transmitter.

The antennas shown in FIG. 8(a)-(b) are Y-directional magnetic antennas 801, but they can be X-directional antennas or Z-directional antennas. They can also be tilt antennas. FIG. 9(a)-(b) show cases of tilt antennas.

FIG. 9(a) shows a transmitter-receiver system in which the transmitter is a tilt magnetic antenna 901, and the receiver is a combination of two tilt magnetic antennas, Rtmup 902 and Rtmdn 903, that are connected to each other with electrical lines shown as dashed lines 904. The dashed lines 904 mean that the electrical lines 904 do not contribute to measurements, and means that Rtmup 902 and Rtmdn 903 are connected in series. $\alpha_t$, $\alpha_{up}$ and $\alpha_{dn}$ are the angles between the borehole axis and the normal directions of the tilt transmitter 901, tilt up receiver 902 and tilt down receiver 903, respectively. As the tilt magnetic antenna transmitter 901 emits EM waves into a formation around it, Rtmup 902 and Rtmdn 903 measure the signal, in this case, voltage. The signal received by Rtmup 902 is Vtmup, and the signal received by Rtmdn 903 is Vtmdn. The measurement of the system can be expressed as:

$$V=Vtm\text{up}+Vtm\text{dn}$$

If the formation around the transmitter-receiver system is a homogeneous medium, Rtmup 902 and Rtmdn 903 are symmetrically positioned on both sides of the tilt transmitter 901, and $\alpha^{up}=\alpha^{dn}$, then:

$$Vtm\text{up}=-Vtm\text{dn}$$

This provides the result: V=0

FIG. 9(b) shows a transmitter-receiver system in which the transmitter is a tilt magnetic antenna 901, and two tilt magnetic antennae, Rtm1 902 and Rtm1 903, are located on both sides of the transmitter 901. $\alpha_t$, $\alpha_{up}$ and $\alpha_{dn}$ are the angles between the borehole axis and the normal directions of the tilt transmitter 901, tilt up receiver 902, and tilt down receiver 903, respectively. As the tilt magnetic antenna transmitter 901 emits EM waves into the formation around it, Rtm1 902 and Rtm2 903 measure the signal, in this case, voltage. The signal received by Rtm1 902 is Vtm1, and the signal received by Rtm2 903 is Vtm2. The measurement of the system can be expressed as:

$$V=Vtm1+Vtm2.$$

If the formation around the transmitter-receiver system is homogeneous medium, Rtm1 902 and Rtm2 903 are symmetrically positioned on both sides of the tilt magnetic antenna transmitter 901, and $\alpha^{up}=\alpha^{dn}$, then:

$$Vtm1=-Vtm2$$

This provides the result: V=0

Figure 10A:
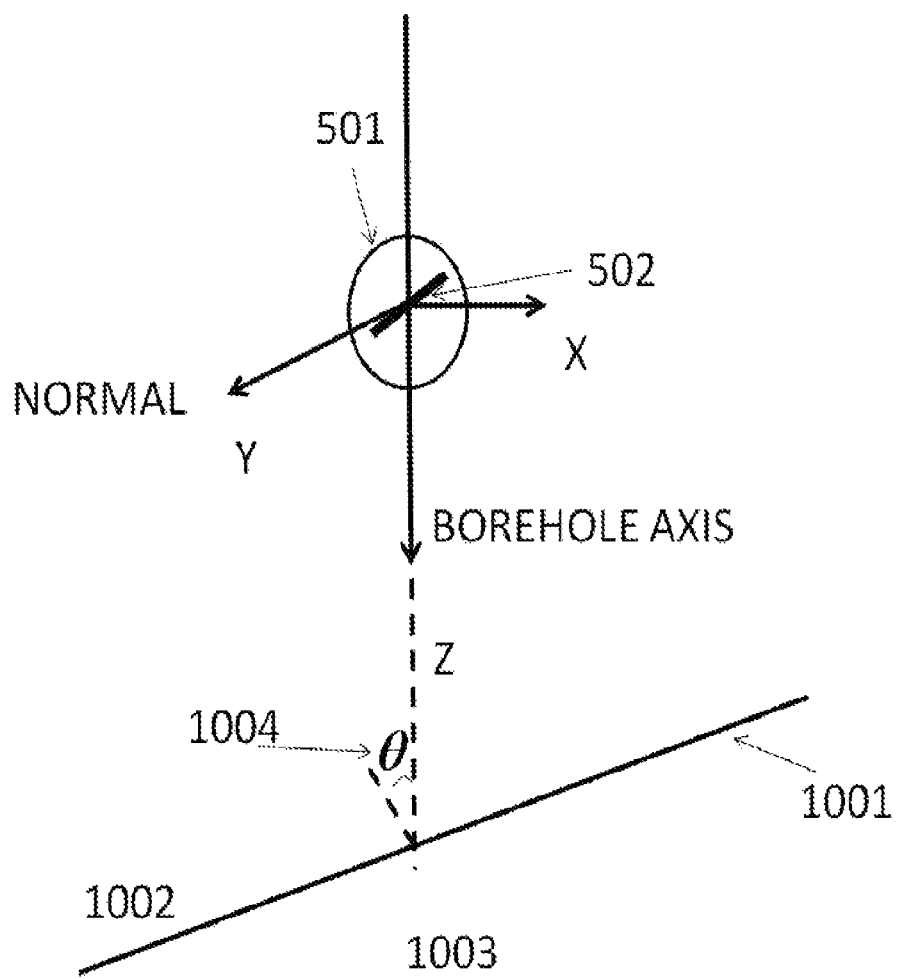
FIG. 10(a) shows the configuration of the EM LWD system in FIG. 5(a) oriented above a formation boundary.

FIG. 10(a) shows a model in which there is a layer boundary 1001 ahead of the transmitter-receiver system described in FIG. 5(a). Layer 1 1002 is above the boundary 1001, and Layer 2 1003 is below the boundary 1001. The angle between the borehole axis and the normal direction of the boundary is θ 1004. Layer 1 1002 and Layer 2 1003 have different electrical parameters, such as resistivity. When the transmitter 501 emits EM waves into the formation around it, some of the EM waves will be reflected by the boundary 1001, and the reflected EM wave will be received by the electric receiver 502. The measurement of the system can be expressed as:

$$V_e(\varphi) = \frac{V_{meyx} + V_{mexy}}{2} - \frac{(V_{meyx} - V_{mexy})}{2}\cos(2\varphi)$$

where φ is tool rotate angle.
In vertical well cases, θ=0, $V_{meyx}=V_{mexy}$, which provides the result:

$$V_e(\varphi)=V_{meyx}$$

The following formulas can be used to determine the boundary position, and the resistivity of each layer by inversion:

$$\text{average}(V_e) = \frac{V_{meyx} + V_{mexy}}{2}$$

$$\Delta(V_e) = V_e(0) - V_e(90) = -(V_{meyx} - V_{mexy})$$

$$\text{Ratio1}(\varphi) = \frac{V_e(\varphi)}{\text{average}(V_e(\varphi))}$$

where average($V_e$) is the average of the measurements taken when the system makes one rotation. The amplitudes and phases of the above formulas are related to boundary 1001 position and formation resistivity. They can be used to determine the boundary position and resistivity of each layer.

Figure 10B:
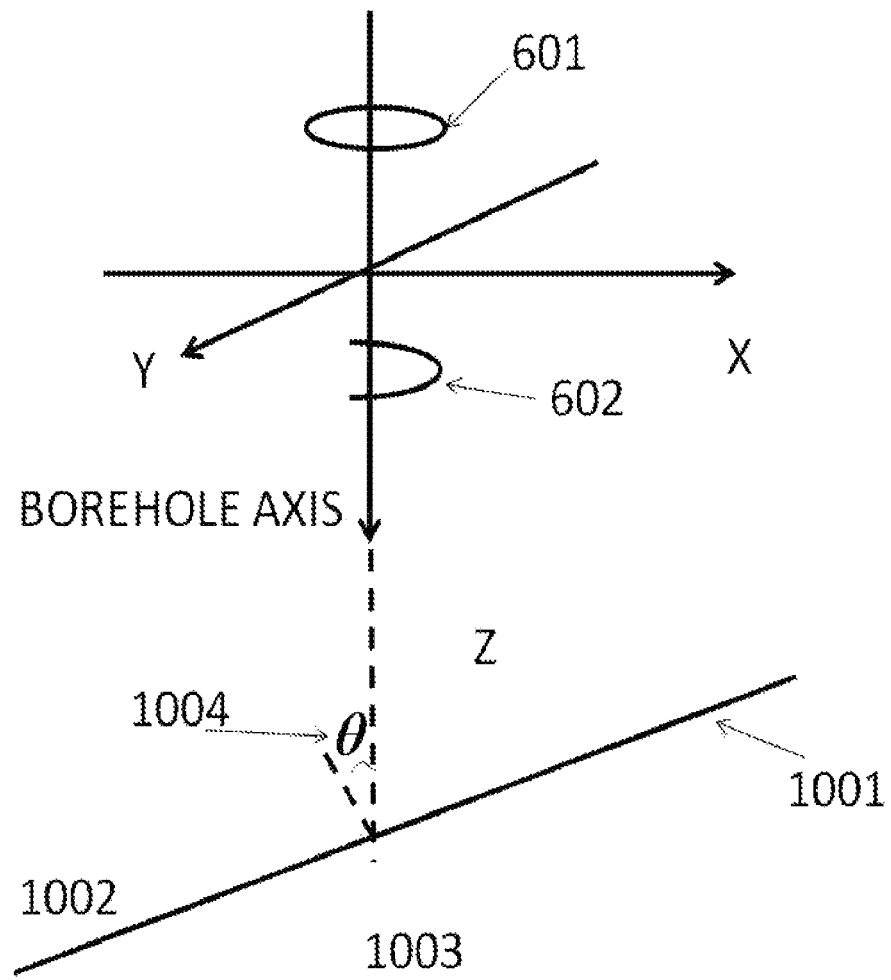
FIG. 10(b) shows the configuration of the EM LWD system in FIG. 6(a) oriented above a formation boundary.

FIG. 10(b) shows a model in which there is a layer boundary 1001 ahead of the transmitter-receiver system described in FIG. 6(a). Layer 1 1002 is above the boundary 1001, and Layer 2 1003 is below the boundary 1001. The angle between the borehole axis and the normal direction of the boundary is θ 1004. Layer 1 1002 and Layer 2 1003 have different electrical parameters, such as resistivity. When the transmitter 601 emits EM waves into the formation around it, some of the EM waves will be reflected by the boundary 1001, and the reflected EM wave will be received by the electric receiver 602.

In horizontal well cases, θ=90, $V_{mezx}=0$. The measurement of the system can be expressed as:

$$V(\varphi)=V_{mmzz}+V_{mezy}\cos\varphi.$$

The following formulas can be used to determine the boundary 1001 position, and the resistivity of each layer by inversion $$\text{average}(V_{(\varphi)})=V_{mmzz},$$

$$V_{mezy} = \frac{V(0) - V(180)}{2}.$$

and $$\text{Ratio2}(\varphi) = \frac{V_{(\varphi)}}{\text{average}(V_{(\varphi)})}.$$

Figure 11A:
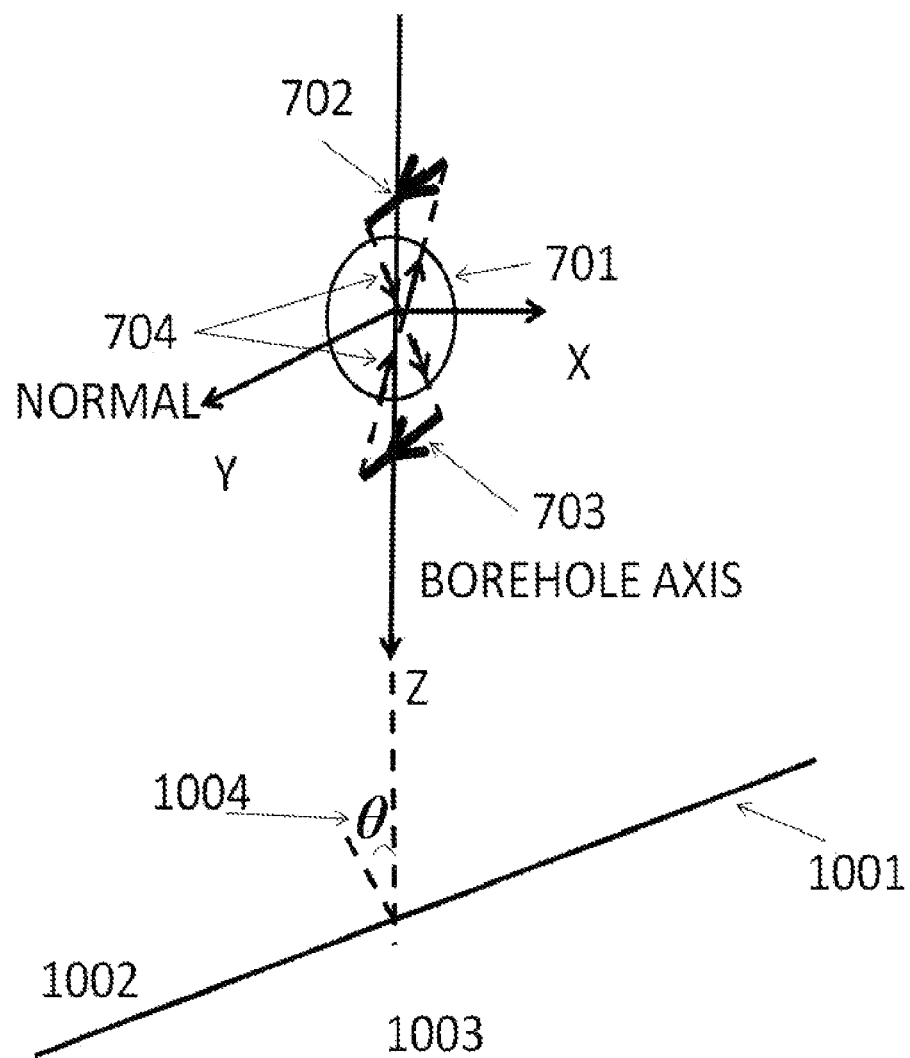
FIG. 11(a) shows the configuration of the EM LWD system in FIG. 7(a) oriented above a formation boundary.

FIG. 11(a) shows a model in which there is a layer boundary 1001 ahead of the transmitter-receiver system described in FIG. 7(a). Layer 1 1002 is above the boundary 1001, and Layer 2 1003 is below the boundary 1001. The angle between the borehole axis and the normal direction of the boundary is θ 1004. Layer 1 1002 and Layer 2 1003 have different electrical parameters, such as resistivity. As the transmitter 701 emits EM waves into the medium, some of the EM wave are reflected by the boundaries 1001, and the reflected EM waves will be received by the two parts 702, 703 of the receiver. The voltage measurement of the system can be expressed as:

$$V_{me}^{up}(\varphi) = \frac{V_{meyx}^{up} + V_{mexy}^{up}}{2} - \frac{V_{meyx}^{up} - V_{mexy}^{up}}{2}\cos(2\phi)$$

$$V_{me}^{dn}(\varphi) = \frac{V_{meyx}^{dn} + V_{mexy}^{dn}}{2} - \frac{V_{meyx}^{dn} - V_{mexy}^{dn}}{2}\cos(2\phi)$$

where $V_{me}^{up}$ and $V_{me}^{dn}$ are the voltages measured by Reup 702 and Redn 703 as the system rotates, $V_{meyx}^{up}$ and $V_{mexy}^{up}$ are the voltages measured by Reup 702, and $V_{meyx}^{dn}$ and $V_{mexy}^{dn}$ are the voltages measured by Redn 703. $\varphi$ is the angle of the system rotation.

The measurement of the system is:

$$V_e(\varphi) = \frac{V_{meyx}^{up} + V_{mexy}^{up} + V_{meyx}^{dn} + V_{mexy}^{dn}}{2} - \frac{V_{meyx}^{up} - V_{mexy}^{up} - V_{meyx}^{dn} + V_{emxy}^{dn}}{2}\cos(2\varphi)$$

If Reup 702 and Redn 703 are symmetrically positioned on both sides of the transmitter 701, $V_e(\varphi)$ only reflects boundary 1001 positions. The following formulas can be used to determine the boundary 1001 position, and the resistivity of each layer:

$$\text{average}(V_e(\varphi)) = \frac{V_{meyx}^{up} + V_{mexy}^{up} + V_{meyx}^{dn} + V_{mexy}^{dn}}{2}$$

$$\Delta(V_e) = V_e(0) - V_e(90) = -V_{meyx}^{up} + V_{mexy}^{up} + V_{meyx}^{dn} - V_{mexy}^{dn}$$

$$\text{Ratio3}(\varphi) = \frac{V_e(\varphi)}{\text{average}(V_e(\varphi))}$$

where average($V_e$) is the average of the measurement taken when the system makes one rotation. The amplitudes and phases are related to boundary position and formation resistivity. They can be used to determine the boundary position and resistivity of each layer.

Figure 11B:
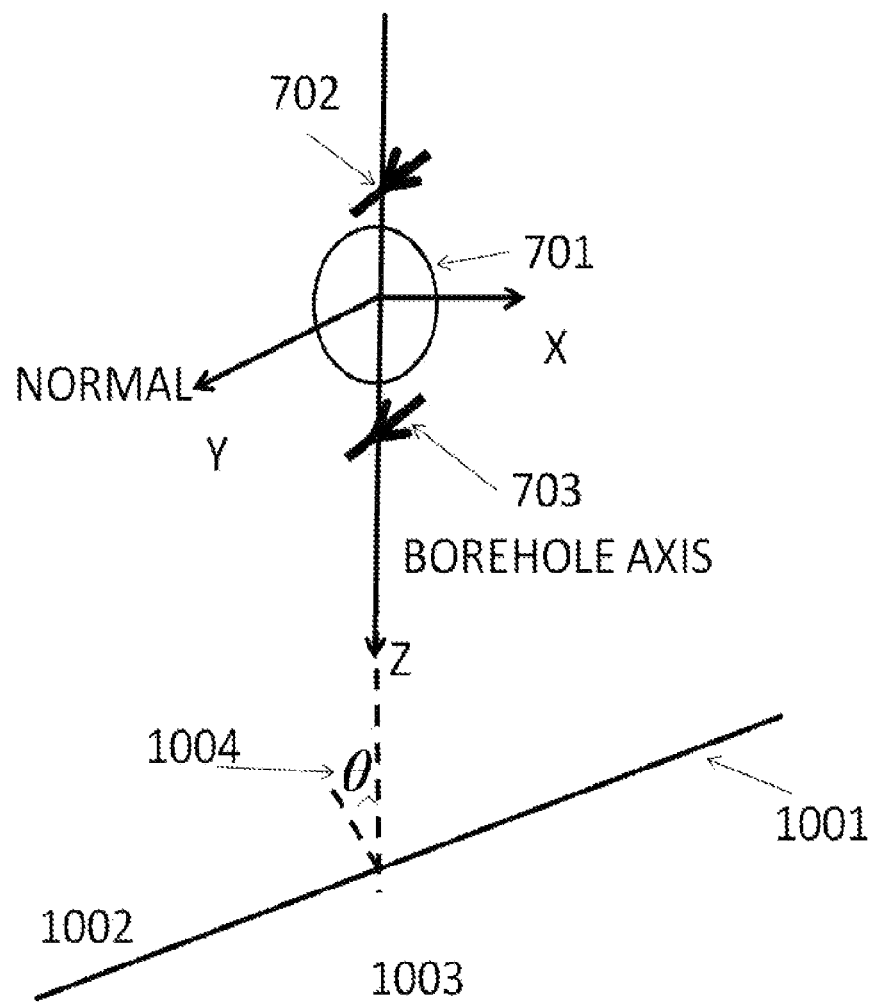
FIG. 11(b) shows the configuration of the EM LWD system in FIG. 7(b) oriented above a formation boundary.

FIG. 11(b) shows a model in which there is a layer boundary 1001 ahead of the transmitter-receiver system shown in FIG. 7(b). Layer 1 1002 is above the boundary 1001, and Layer 2 1003 is below the boundary 1001. The angle 1004 between the borehole axis and the normal direction of the boundary is θ. Layer 1 1002 and Layer 2 1003 have different electrical parameters, such as resistivity. As the transmitter 701 emits EM waves into the medium, some of the EM waves will be reflected by the boundary 1001, and the reflected EM wave will be received by the two electric antennas 702, 703 of the receiver. The voltage measurement can be expressed as:

$$V_e^1(\varphi) = \frac{V_{meyx}^1 + V_{mexy}^1}{2} - \frac{V_{meyx}^1 - V_{mexy}^1}{2}\cos(2\phi)$$

$$V_e^2(\varphi) = \frac{V_{meyx}^2 + V_{mexy}^2}{2} - \frac{V_{meyx}^2 - V_{mexy}^2}{2}\cos(2\phi)$$

where $V_e^1$ and $V_e^2$ are the voltage measured by Re1 702 and Re2 703 as the system rotates, $V_{meyx}^1$ and $V_{mexy}^1$ are the voltage measured by Re1 702, and $V_{meyx}^2$ and $V_{mexy}^2$ are the voltage measured by Re2 703.

The sum of $V_e^1$ and $V_e^2$ is:

$$V_e(\varphi) = V_e^1(\varphi) + V_e^2(\varphi) =$$

$$\frac{V_{meyx}^1 + V_{mexy}^1 - V_{meyx}^2 - V_{mexy}^2}{2} - \frac{V_{meyx}^1 - V_{mexy}^1 - V_{meyx}^2 + V_{mexy}^2}{2}\cos(2\varphi)$$

If Re1 702 and Re2 703 are symmetrically positioned on both sides of the transmitter 701, $V_e(\varphi)$ only reflects boundary 1001 positions. The following computations can be used to determine the boundary 1001 position, and the resistivity of each layer:

$$\text{average}(V_e) = \frac{V_{meyx}^1 + V_{mexy}^1 - V_{meyx}^2 - V_{mexy}^2}{2}$$

$$\Delta(V_e) = V_e(0) - V_e(90) = -V_{meyx}^1 + V_{mexy}^1 + V_{meyx}^2 - V_{mexy}^2$$

$$\text{Ratio4}(\varphi) = \frac{V_e(\varphi)}{\text{average}(V_e(\varphi))}$$

$$\text{Ratio5}(\varphi) = \frac{V_e^1(\varphi)}{V_e^2(\varphi)}$$

$$\text{Ratio6}(\varphi) = \frac{V_e^2(\varphi)}{V_e^1(\varphi)}$$

$$\text{Ratio7}(\varphi) = \frac{V_e^1(\varphi) - V_e^2(\varphi)}{V_e^1(\varphi) + V_e^2(\varphi)}$$

$$\text{Ratio8}(\varphi) = \frac{V_e^1(\varphi) - V_e^2(\varphi)}{V_e^2(\varphi)}$$

$$\text{Ratio9}(\varphi) = \frac{V_e^1(\varphi) - V_e^2(\varphi)}{V_e^1(\varphi)}$$

The amplitudes and phases are related to boundary 1001 position and can be used to determine the boundary 1001 position and resistivity of each layer.

Figure 11C:
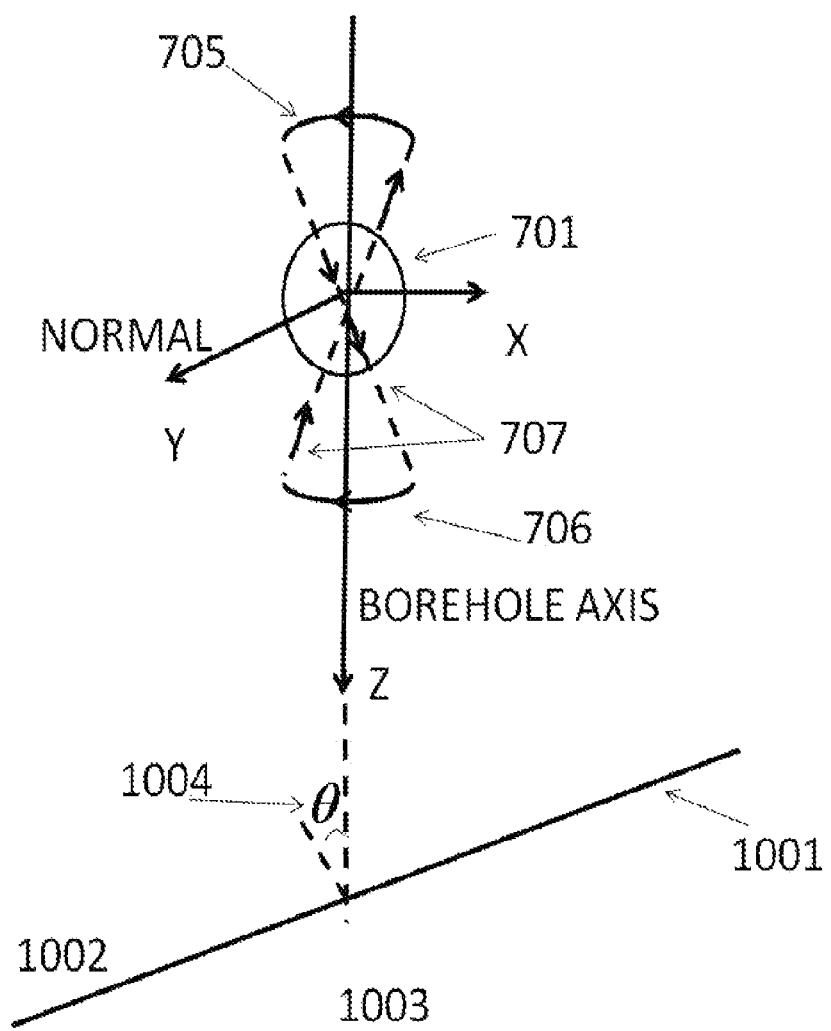
FIG. 11(c) shows the configuration of the EM LWD system in FIG. 7(c) oriented above a formation boundary.

FIG. 11(c) shows a model in which there is a layer boundary 1001 ahead of the transmitter-receiver system described in FIG. 7(c). Layer 1 1002 is above the boundary 1001, and Layer 2 1003 is below the boundary 1001. The angle between the borehole axis and the normal direction of the boundary is θ 1004. Layer 1 1002 and Layer 2 1003 have different electrical parameters, such as resistivity. As the transmitter 701 emits EM waves into the medium, some of the EM wave are reflected by the boundary 1001, and the reflected EM waves will be received by the two parts 705, 706 of the receiver. The voltage measurement of the system can be expressed as:

$$V^{up}(\varphi) =$$

$$V_{mmyz}^{up}\cos(\varphi) + V_{mmxz}^{up}\sin(\varphi) + \frac{V_{meyx}^{up} + V_{mexy}^{up}}{2} + \frac{V_{meyx}^{up} - V_{mexy}^{up}}{2}\cos(2\varphi)$$

$$V^{dn}(\varphi) = V_{mmyz}^{dn}\cos(\varphi) + V_{mmxz}^{dn}\sin(\varphi) +$$

$$\frac{V_{meyx}^{dn} + V_{mexy}^{dn}}{2} + \frac{V_{meyx}^{dn} - V_{mexy}^{dn}}{2}\cos(2\varphi)$$

The measurement of the system is:

$$V(\varphi) = V_{mmyz}^{up}\cos(\varphi) + V_{mmxz}^{up}\sin(\varphi) + V_{mmyz}^{dn}\cos(\varphi) + V_{mmxz}^{dn}\sin(\varphi) +$$

-continued $$\frac{V_{meyx}^{up} + V_{mexy}^{up} + V_{meyx}^{dn} + V_{mexy}^{dn}}{2} - \frac{V_{meyx}^{up} - V_{mexy}^{up} - V_{meyx}^{dn} + V_{emxy}^{dn}}{2}\cos(2\varphi)$$

If Rup 705 and Rdn 706 are symmetrically positioned on both sides of the transmitter 701, V(φ) only reflects boundary 1001 positions. The following formulas can be used to determine the boundary 1001 position, and the resistivity of each layer:

$$\text{average}(V(\varphi)) = \frac{V_{meyx}^{up} + V_{mexy}^{up} + V_{meyx}^{dn} + V_{mexy}^{up}}{2}$$

$$\Delta(V) = V(0) - V(90) = -V_{meyx}^{up} + V_{mexy}^{up} + V_{meyx}^{dn} - V_{mexy}^{dn}$$

$$\text{Ratio}10(\varphi) = \frac{V(\varphi)}{\text{average}(V(\varphi))}$$

where average(V(φ)) is the average of the measurement taken when the system makes one rotation. The amplitudes and phases are related to boundary 1001 position and formation resistivity. They can be used to determine the boundary 1001 position and resistivity of each layer.

Figure 11D:
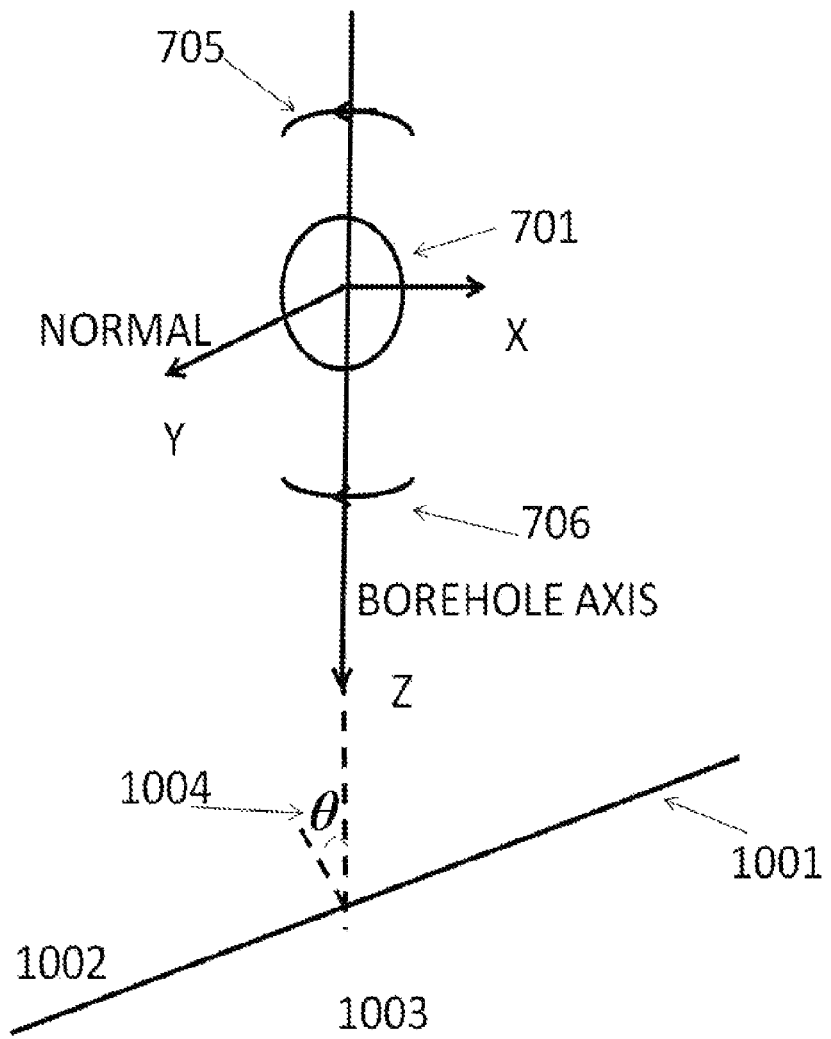
FIG. 11(d) shows the configuration of the EM LWD system in FIG. 7(d) oriented above a formation boundary.

FIG. 11(d) shows a model in which there is a layer boundary 1001 ahead of the transmitter-receiver system described in FIG. 7(d). Layer 1 1002 is above the boundary 1001, and Layer 2 1003 is below the boundary 1001. The angle between the borehole axis and the normal direction of the boundary is θ 1004. Layer 1 1002 and Layer 2 1003 have different electrical parameters, such as resistivity. As the transmitter 701 emits EM waves into the medium, some of the EM wave are reflected by the boundary 1001, and the reflected EM waves will be received by the two receivers 705, 706. The voltage measurement of the system can be expressed as:

$$V^1(\varphi) =$$
$$V_{mmyz}^1\cos(\varphi) + V_{mmxz}^1\sin(\varphi) + \frac{V_{meyx}^1 + V_{mexy}^1}{2} + \frac{V_{meyx}^1 - V_{mexy}^1}{2}\cos(2\varphi)$$

$$V^2(\varphi) = V_{mmyz}^2\cos(\varphi) + V_{mmxz}^2\sin(\varphi) +$$
$$\frac{V_{meyx}^2 + V_{mexy}^2}{2} + \frac{V_{meyx}^2 - V_{mexy}^2}{2}\cos(2\varphi)$$

The sum measurement of the system is:

$$V(\varphi) = V_{mmyz}^1\cos(\varphi) + V_{mmxz}^1\sin(\varphi) + V_{mmyz}^2\cos(\varphi) + V_{mmxz}^2\sin(\varphi) +$$
$$\frac{V_{meyx}^1 + V_{mexy}^1 + V_{meyx}^2 + V_{mexy}^2}{2} - \frac{V_{meyx}^1 - V_{mexy}^1 - V_{meyx}^2 + V_{emxy}^2}{2}\cos(2\varphi)$$

If R1 705 and R2 706 are symmetrically positioned on both sides of the transmitter 701, V(φ) only reflects boundary 1001 positions. The following formulas can be used to determine the boundary 1001 position, and the resistivity of each layer:

$$\text{average}(V(\varphi)) = \frac{V_{meyx}^1 + V_{mexy}^1 + V_{meyx}^2 + V_{mexy}^2}{2}$$

$$\Delta(V) = V(0) - V(90) = -V_{meyx}^1 + V_{mexy}^1 + V_{meyx}^2 - V_{mexy}^2$$

$$\text{Ratio }11(\varphi) = \frac{V(\varphi)}{\text{average}(V(\varphi))}$$

$$\text{Ratio }12(\varphi) = \frac{V^1(\varphi)}{V^2(\varphi)}$$

$$\text{Ratio }13(\varphi) = \frac{V^2(\varphi)}{V^1(\varphi)}$$

$$\text{Ratio }14(\varphi) = \frac{V^1(\varphi) - V^2(\varphi)}{V^1(\varphi) + V^2(\varphi)}$$

$$\text{Ratio }15(\varphi) = \frac{V^1(\varphi) - V^2(\varphi)}{V^2(\varphi)}$$

$$\text{Ratio }16(\varphi) = \frac{V^1(\varphi) - V^2(\varphi)}{V^1(\varphi)}$$

where average(V(φ)) is the average of the measurement taken when the system makes one rotation. The amplitudes and phases are related to boundary 1001 position and formation resistivity. They can be used to determine the boundary 1001 position and resistivity of each layer.

Figure 12A:
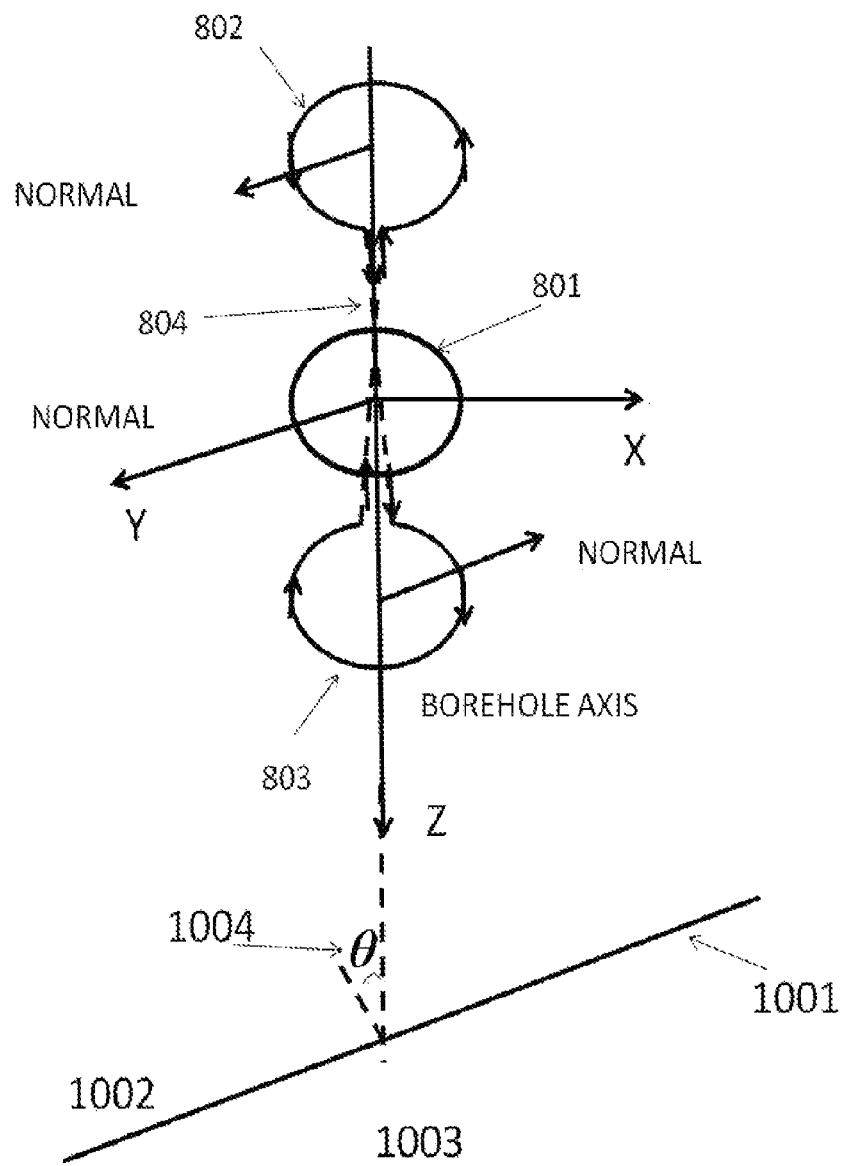
FIG. 12(a) shows the configuration of the EM LWD system in FIG. 8(a) oriented above a formation boundary.

FIG. 12(a) shows a model in which there is a layer boundary 1001 ahead of the transmitter-receiver system described in FIG. 8(a). Layer 1 1002 is above the boundary 1001, and Layer 2 1003 is below the boundary 1001. The angle between the borehole axis and the normal direction of the boundary is θ 1004. Layer 1 1002 and Layer 2 1003 have different electrical parameters, such as resistivity. As the transmitter 801 emits EM waves into the medium, some of the EM waves will be reflected by the boundary 1001, and the reflected EM waves will be received by the two parts 802, 803 of the receiver, Rmup 802 and Rmdn 803. The voltage measurement can be expressed as:

$$V_m^{up}(\varphi) = \frac{V_{myy}^{up} + V_{mxx}^{up}}{2} + \frac{\cos(2\varphi)}{2}(V_{myy}^{up} - V_{mxx}^{up})$$

$$V_m^{dn}(\varphi) = -\frac{V_{myy}^{dn} + V_{mxx}^{dn}}{2} - \frac{\cos(2\varphi)}{2}(V_{myy}^{dn} - V_{mxx}^{dn})$$

where $V_{myy}^{up}$, $V_{mxx}^{up}$, $V_{myx}^{up}$ and $V_{mxy}^{up}$ are the yy, xx, yx, and xy components with respect to Rmup 802, and $V_{myy}^{dn}$, $V_{mxx}^{dn}$, $V_{myx}^{dn}$ and $V_{mxy}^{dn}$ are the yy, xx, yx, and xy components with respect to Rmdn 803.

The measurement of the system is:

$$V_m(\varphi) = \frac{V_{myy}^{up} + V_{mxx}^{up} - V_{myy}^{dn} - V_{mxx}^{dn}}{2} + \frac{\cos(2\varphi)}{2}(V_{myy}^{up} - V_{mxx}^{up} - V_{myy}^{dn} + V_{mxx}^{dn})$$

If Rmup 802 and Rmdn 803 are symmetrically positioned at both sides of the transmitter 801, $V_m(\varphi)$ only reflects boundary 1001 positions. The following formulas can be used to determine the boundary 1001 position, and the resistivity of each layer:

$$\text{average}(V_m) = \frac{V_{myy}^{up} + V_{mxx}^{up} + V_{myy}^{dn} - V_{mxx}^{dn}}{2}$$

$$\Delta(V_m) = V_m(0) - V_m(90) = V_{myy}^{up} - V_{mxx}^{up} - V_{myy}^{dn} + V_{mxx}^{dn}$$

$$\text{Ratio }17 = \frac{V_m(\varphi)}{\text{average}(V_m(\varphi))}$$

where average($V_m$) is the average of the measurements taken while the system makes one rotation. The amplitudes and phases of above formulas are related to boundary 1001 position and formation resistivity, and can be used to determine the boundary 1001 position and resistivity of each layer by inversion.

Figure 12B:
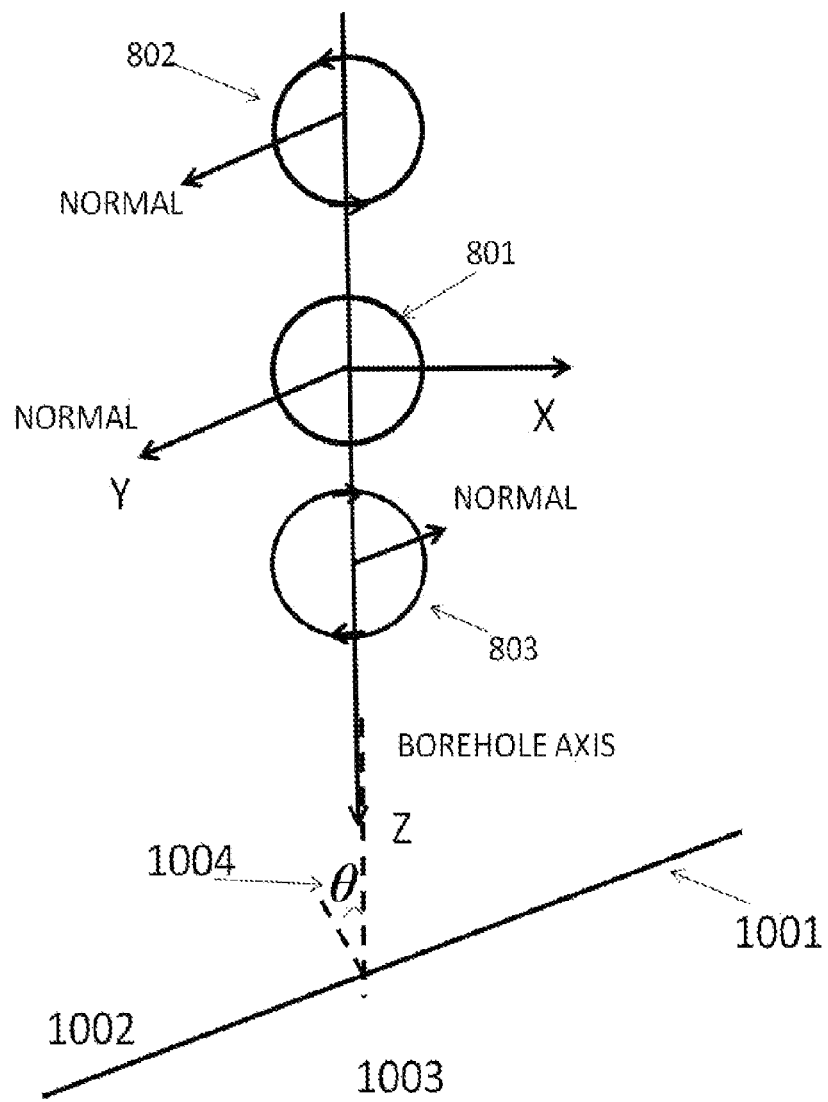
FIG. 12(b) shows the configuration of the EM LWD system in FIG. 8(b) oriented above a formation boundary.

FIG. 12(b) shows a model in which there is a layer boundary 1001 below the transmitter-receiver system described in FIG. 8(b). Layer 1 1002 is the layer where the transmitter-receiver system is located. Layer 2 1003 is the other layer. If Layer 1 1001 and Layer 2 1002 have different electrical parameters, such as resistivity, then when the transmitter 801 emits EM waves into the medium, some of the EM waves will be reflected by the boundary 1001, and the reflected EM waves will be measured by Rm1 802 and Rm2 803. The voltage measurements, $V_m^1$ and $V_m^2$, can be expressed as:

$$V_m^1(\varphi) = \frac{V_{myy}^1 + V_{mxx}^1}{2} + \frac{\cos(2\varphi)}{2}(V_{myy}^1 - V_{mxx}^1)$$

$$V_m^2(\varphi) = -\frac{V_{myy}^2 + V_{mxx}^2}{2} - \frac{\cos(2\varphi)}{2}(V_{myy}^2 - V_{mxx}^2)$$

where $V_{myy}^1$, $V_{mxx}^1$, $V_{myx}^1$ and $V_{mxy}^1$ are the yy, xx, yx, and xy components with respect to Rm1 802, and $V_{myy}^2$, $V_{mxx}^2$, $V_{myx}^2$ and $V_{mxy}^2$ are the yy, xx, yx, and xy components with respect to Rm2 803.

The sum of the measurements is:

$$V_m(\varphi) = \frac{V_{myy}^1 + V_{mxx}^1 - V_{myy}^2 - V_{mxx}^2}{2} + \frac{\cos(2\varphi)}{2}(V_{myy}^1 - V_{mxx}^1 - V_{myy}^2 + V_{mxx}^2)$$

If Rm1 802 and Rm2 803 are symmetrically positioned at both sides of the transmitter 801, $V_m(\varphi)$ only reflects boundary 1001 positions. The following formulas can be used to determine the boundary 1001 position and resistivity of each layer:

$$\text{average}(V_m) = \frac{V_{myy}^1 + V_{mxx}^1 - V_{myy}^2 - V_{mxx}^2}{2}$$

$$\Delta(V_m) = V_m(0) - V_m(90) = (V_{myy}^1 + V_{mxx}^1 + V_{myy}^2 - V_{mxx}^2)$$

$$\text{Ratio } 18(\varphi) = \frac{V_m(\varphi)}{\text{average}(V_m(\varphi))}$$

$$\text{Ratio } 19(\varphi) = \frac{V_m^1(\varphi)}{V_m^2(\varphi)}$$

$$\text{Ratio } 20(\varphi) = \frac{V_m^2(\varphi)}{V_m^1(\varphi)}$$

$$\text{Ratio } 21(\varphi) = \frac{V_m^1(\varphi) - V_m^2(\varphi)}{V_m^1(\varphi) + V_m^2(\varphi)}$$

$$\text{Ratio } 22(\varphi) = \frac{V_m^1(\varphi) - V_m^2(\varphi)}{V_m^1(\varphi)}$$

$$\text{Ratio } 23(\varphi) = \frac{V_m^1(\varphi) - V_m^2(\varphi)}{V_m^1(\varphi)}$$

where average($V_m$) is the average of the measurements taken while the system makes one rotation. The amplitudes and phases are related to boundary 1001 position and formation resistivity and can be used to determine the boundary 1001 position and resistivity of each layer.

Figure 13A:
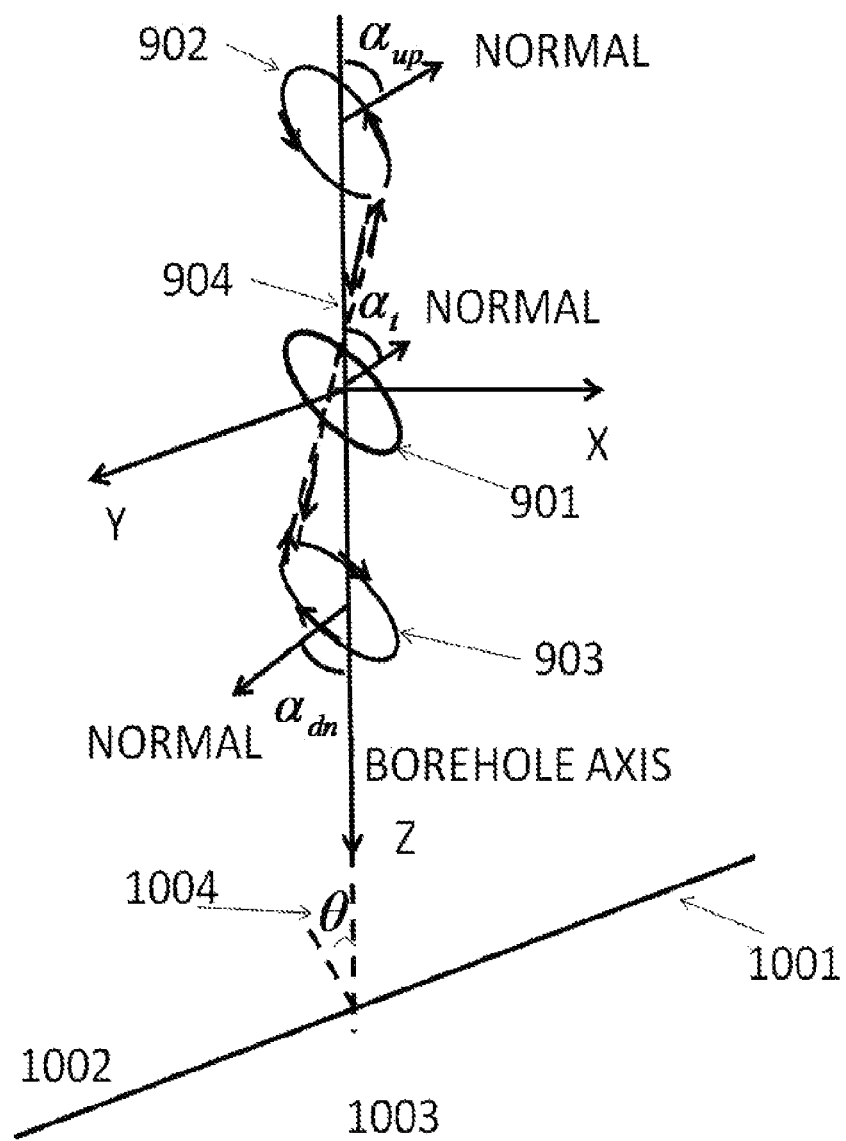
FIG. 13(a) shows the configuration of the EM LWD system in FIG. 9(a) oriented above a formation boundary.
Figure 13B:
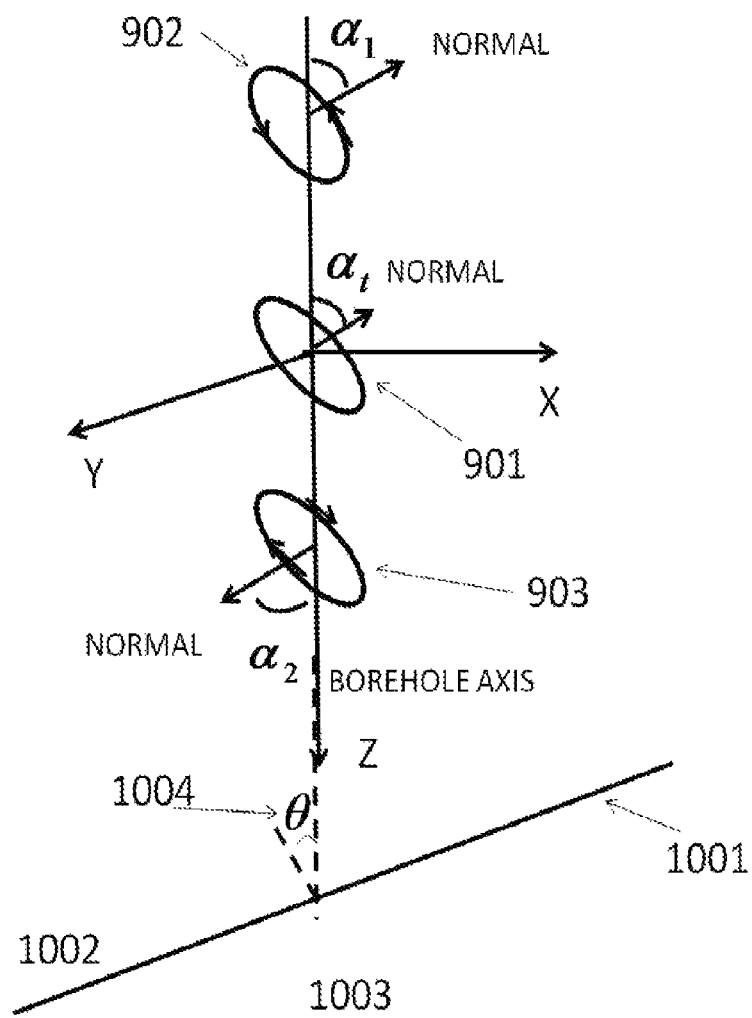
FIG. 13(b) shows the configuration of the EM LWD system in FIG. 9(b) oriented above a formation boundary.

The above discussion, as an example, is based on Y-directional magnetic antenna as transmitter and receiver. Tilt magnetic antennas can also be used as transmitter and receiver. FIG. 13(a)-(b) show cases of tilt magnetic antennas as transmitter and receivers.

FIG. 13(a) shows a model in which there is a layer boundary 1001 ahead of the transmitter-receiver system described in FIG. 9(a). Layer 1 1002 is above the boundary 1001, and Layer 2 1003 is below the boundary 1001. The angle between the borehole axis and the normal direction of the boundary is θ 1004. Layer 1 1002 and Layer 2 1003 have different electrical parameters, such as resistivity. As the transmitter 901 emits EM waves into the medium, some of the EM waves will be reflected by the boundary 1001, and the reflected EM waves will be received by Rtmup 902 and Rtmdn 903. The measurement of Rtmup 902 and Rtmdn 903 can be expressed as:

$$V_{tm}^{up}(\varphi) = \frac{(V_{mxx}^{up} + V_{myy}^{up})\sin\alpha^t\sin\alpha^{up} + 2V_{mzz}^{up}\cos\alpha^t\cos\alpha^{up}}{2} -$$

$$\frac{V_{myy}^{up} - V_{mxx}^{up}}{2}\sin\alpha^t\sin\alpha^{up}\cos2\varphi + \frac{\sin\alpha^t\sin\alpha^{up}(V_{mxy}^{up} + V_{myx}^{up})}{2}\sin2\varphi +$$

$$(\sin\alpha^t\cos\alpha^{up}V_{mxz}^{up} + \cos\alpha^t\sin\alpha^{up}V_{mzx}^{up})\sin\varphi +$$

$$(\sin\alpha^t\cos\alpha^{up}V_{myz}^{up} + \cos\alpha^t\sin\alpha^{up}V_{mzy}^{up})\cos\varphi$$

$$V_{tm}^{dn}(\varphi) = -\frac{(V_{mxx}^{dn} + V_{myy}^{dn})\sin\alpha^t\sin\alpha^{dn} + 2V_{mzz}^{dn}\cos\alpha^t\cos\alpha^{dn}}{2} +$$

$$\frac{V_{myy}^{dn} - V_{mxx}^{dn}}{2}\sin\alpha^t\sin\alpha^{dn}\cos2\varphi - \frac{\sin\alpha^t\sin\alpha^{dn}(V_{mxy}^{dn} + V_{myx}^{dn})}{2}\sin2\varphi -$$

$$(\sin\alpha^t\cos\alpha^{dn}V_{mxz}^{dn} + \cos\alpha^t\sin\alpha^{dn}V_{mzx}^{dn})\sin\varphi -$$

$$(\sin\alpha^t\cos\alpha^{dn}V_{myz}^{dn} + \cos\alpha^t\sin\alpha^{dn}V_{mzy}^{dn})\cos\varphi$$

where $V_{mxx}^{up}$, $V_{myy}^{up}$, $V_{mzz}^{up}$, $V_{mxy}^{up}$, $V_{myx}^{up}$, $V_{mxz}^{up}$, $V_{mzx}^{up}$, $V_{myz}^{up}$ and $V_{mzy}^{up}$ are the components with respect to Rtmup 902, and $V_{mxx}^{dn}$, $V_{myy}^{dn}$, $V_{mzz}^{dn}$, $V_{mxy}^{dn}$, $V_{myx}^{dn}$, $V_{mxz}^{dn}$, $V_{mzx}^{dn}$, $V_{myz}^{dn}$ and $V_{mzy}^{dn}$ are the components with respect to Rtmdn 903.

The measurement of the system is:

$$V_{tm}(\varphi) = V_{tm}^{up}(\varphi) - V_{tm}^{dn}(\varphi)$$

If Rmup 902 and Rmdn 903 are symmetrically positioned on both sides of the transmitter 901, and $\alpha^{up}=\alpha^{dn}$, $V_{tm}(\varphi)$ only reflects boundary 1001 positions. The following computations can be used to determine the boundary 1001 position and resistivity of each layer:

$$\text{average}(V_{tm}(\varphi)) = \frac{(V_{mxx}^{up} + V_{myy}^{up})\sin\alpha^t\sin\alpha^{up} + 2V_{mzz}^{up}\cos\alpha^t\cos\alpha^{up}}{2} -$$

$$\frac{(V_{mxx}^{dn} + V_{myy}^{dn})\sin\alpha^t\sin\alpha^{dn} + 2V_{mzz}^{dn}\cos\alpha^t\cos\alpha^{dn}}{2}$$

$$\text{Ratio } 24 = \frac{V_{tm}(\varphi)}{\text{average}(V_{tm}(\varphi))}$$

where average($V_m$) is the average of the measurements taken while the system makes one rotation. The amplitudes and phases of above formulas are related to boundary 1001 position and formation resistivity, and can be used to determine the boundary 1001 position and resistivity of each layer.

FIG. 13(b) shows a model in which there is a layer boundary 1001 ahead of the transmitter-receiver system described in FIG. 9(b). Layer 1 1002 is above the boundary 1001, and Layer 2 1003 is below the boundary 1001. The angle between the borehole axis and the normal direction of the boundary is θ 1004. Layer 1 1002 and Layer 2 1003 have different electrical parameters, such as resistivity. As the transmitter 901 emits EM waves into the medium, some of the EM waves will be reflected by the boundary 1001, and the reflected EM waves will be received by Rm1 902 and Rm2 903. The voltage measurement can be expressed as:

$$V_{tm}^1(\varphi) = \frac{(V_{mxx}^1 + V_{myy}^1)\sin\alpha^t\sin\alpha^1 + 2V_{mzz}^1\cos\alpha^t\cos\alpha^1}{2} -$$
$$\frac{V_{myy}^1 - V_{mxx}^1}{2}\sin\alpha^t\sin\alpha^1\cos 2\varphi + \frac{\sin\alpha^t\sin\alpha^1(V_{mxy}^1 + V_{myx}^1)}{2}\sin 2\varphi +$$
$$(\sin\alpha^t\cos\alpha^1 V_{mxz}^1 + \cos\alpha^t\sin\alpha^1 V_{mzx}^1)\sin\varphi +$$
$$(\sin\alpha^t\cos\alpha^1 V_{myz}^1 + \cos\alpha^t\sin\alpha^1 V_{mzy}^1)\cos\varphi$$

$$V_{tm}^2(\varphi) = -\frac{(V_{mxx}^2 + V_{myy}^2)\sin\alpha^t\sin\alpha^2 + 2V_{mzz}^2\cos\alpha^t\cos\alpha^2}{2} +$$
$$\frac{V_{myy}^2 - V_{mxx}^2}{2}\sin\alpha^t\sin\alpha^2\cos 2\varphi - \frac{\sin\alpha^t\sin\alpha^2(V_{mxy}^2 + V_{myx}^2)}{2}\sin 2\varphi -$$
$$(\sin\alpha^t\cos\alpha^2 V_{mxz}^2 + \cos\alpha^t\sin\alpha^2 V_{mzx}^2)\sin\varphi -$$
$$(\sin\alpha^t\cos\alpha^2 V_{myz}^2 + \cos\alpha^t\sin\alpha^2 V_{mzy}^2)\cos\varphi$$

where $V_{mxx}^1$, $V_{myy}^1$, $V_{mzz}^1$, $V_{mxy}^1$, $V_{myx}^1$, $V_{mxz}^1$, $V_{mzx}^1$, $V_{myz}^1$ and $V_{mzy}^1$ are the components with respect to Rtm1 902, and $V_{mxx}^2$, $V_{myy}^2$, $V_{mzz}^2$, $V_{mxy}^2$, $V_{myx}^2$, $V_{mxz}^2$, $V_{mzx}^2$, $V_{myz}^2$ and $V_{mzy}^2$ are the components with respect to Rm2 903.

The sum of Rm1 902 and Rm2 903 is:

$$V_{tm}(\varphi) = V_{tm}^1(\varphi) + V_{tm}^2(\varphi)$$

If Rtm1 902 and Rtm2 903 are symmetrically positioned on both sides of the transmitter 901 and $\alpha^1 = \alpha^2$, V(φ) only reflects boundary 1001 positions.

The following computation can be used to determine the boundary 1001 position and resistivity of each layer:

$$\text{average}(V_{tm}(\varphi)) = \frac{(V_{xx}^{tm1} + V_{yy}^{tm1})\sin\alpha^t\sin\alpha^{tm1} + 2V_{zz}^{tm1}\cos\alpha^t\cos\alpha^{tm1}}{2} -$$
$$\frac{(V_{xx}^{tm2} + V_{yy}^{tm2})\sin\alpha^t\sin\alpha^{tm2} + 2V_{zz}^{tm2}\cos\alpha^t\cos\alpha^{tm2}}{2}$$

$$\text{Ratio } 25(\varphi) = \frac{V_{tm}(\varphi)}{\text{average}(V_{tm}(\varphi))}$$

$$\text{Ratio } 26(\varphi) = \frac{V_{tm}^1(\varphi)}{V_{tm}^2(\varphi)}$$

$$\text{Ratio } 27(\varphi) = \frac{V_{tm}^2(\varphi)}{V_{tm}^1(\varphi)}$$

$$\text{Ratio } 28(\varphi) = \frac{V_{tm}^1(\varphi) - V_{tm}^2(\varphi)}{V_{tm}^1(\varphi) + V_{tm}^2(\varphi)}$$

$$\text{Ratio } 29(\varphi) = \frac{V_{tm}^1(\varphi) - V_{tm}^2(\varphi)}{V_{tm}^2(\varphi)}$$

$$\text{Ratio } 30(\varphi) = \frac{V_{tm}^1(\varphi) - V_{tm}^2(\varphi)}{V_{tm}^1(\varphi)},$$

where average($V_m$) is the average of the measurements taken while the system makes one rotation. The amplitudes and phases are related to boundary 1001 position and can be used to determine the boundary 1001 position and resistivity of each layer.

Figure 14A:
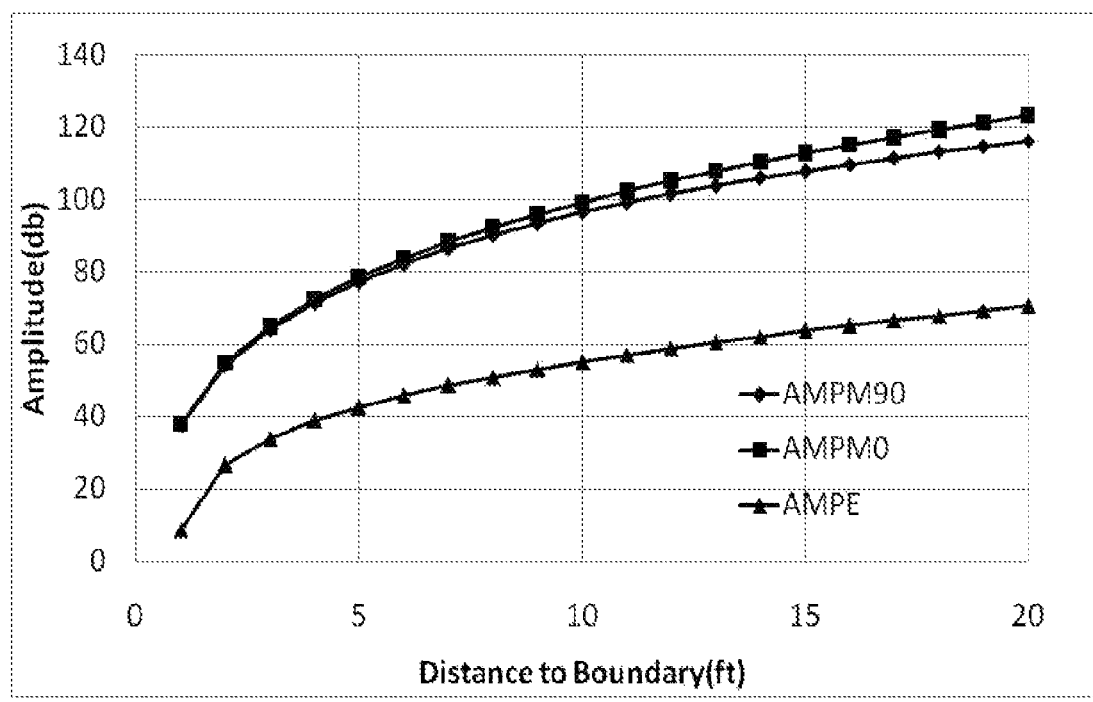
FIG. 14(a)-(c) shows the relationship between responses of a EM LWD system and a boundary position.
Figure 14B:
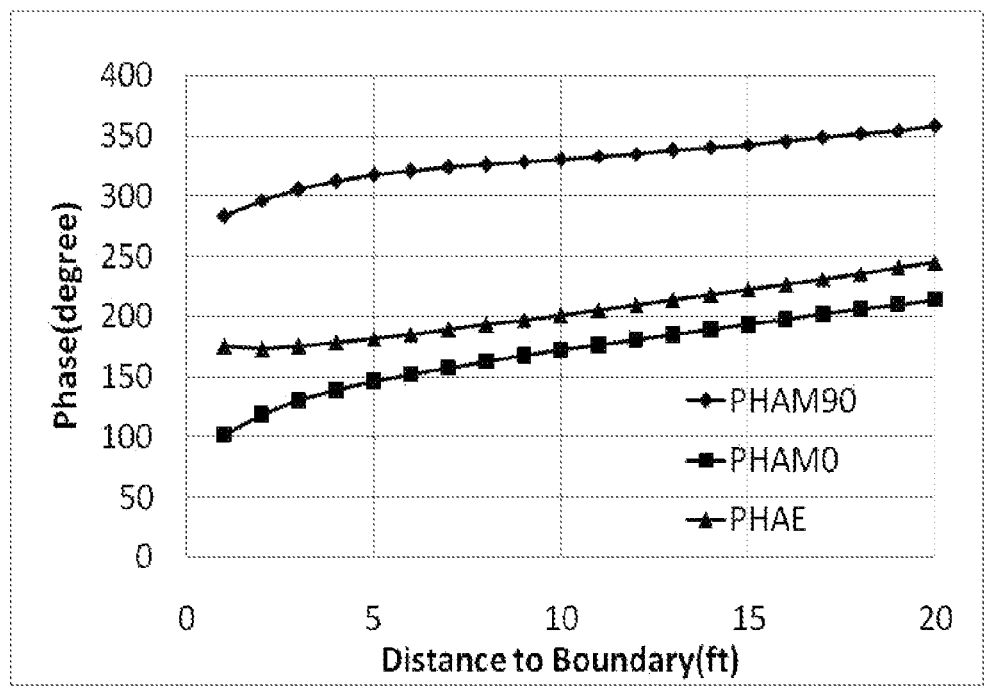
Figure 14C:
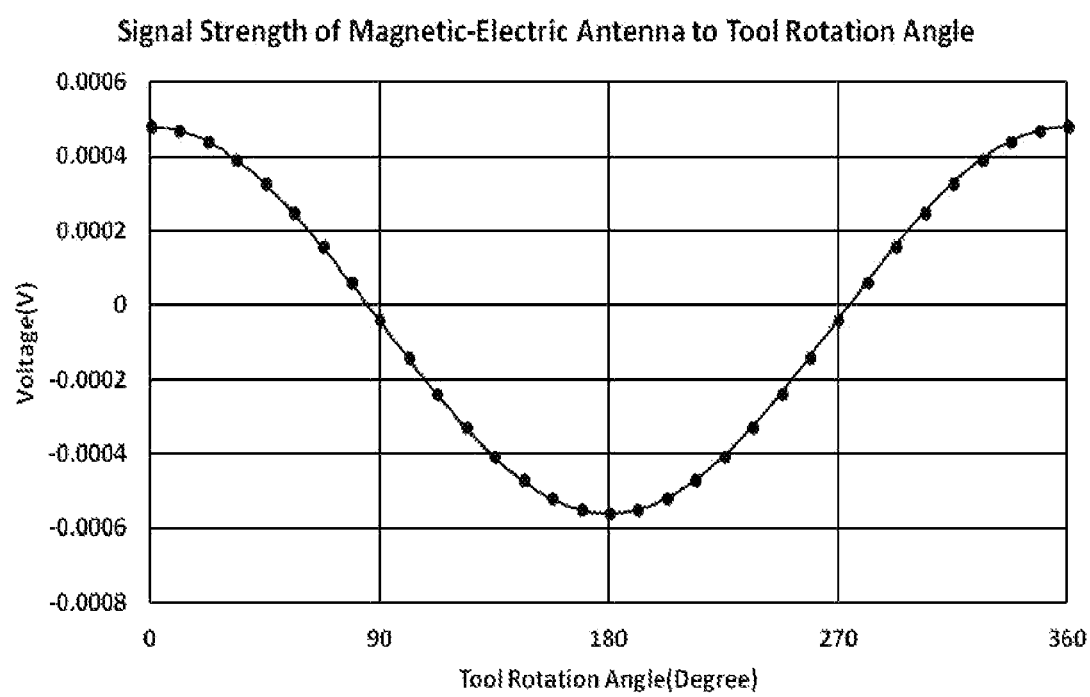

FIG. 14(*a*)-(*b*) show a relationship between a model applying Ratio20(φ) and Ratio6(φ). The model takes R1 705, 802 and R2 706, 803 to be located at 12 (inch) and −12 (inch) with respect to the transmitter 701,801, the formation resistivity in LAYER1 1002 and LAYER2 1003 to be 100 (ohm-m) and 1 (ohm-m), respectively, the frequency to be 500,000 (Hz), and θ=0.

FIG. 14(*a*) shows a relationship between the amplitude of Ratio20(φ) and Ratio6(φ) and the distance to boundary. AMPM90 and AMPM0 represent the amplitude of Ratio20(φ) when $\alpha^{tm1} = \alpha^{tm2} = \alpha^t = 90$ (degree) and $\alpha^{tm1} = \alpha^{tm2} = \alpha^t = 0$ (degree), respectively. AMPE represents the amplitude of Ratio6(φ).

FIG. 14(*b*) shows a relationship between the phase of Ratio20(φ) and Ratio6(φ) and the distance to boundary. PHAM90 and PHAM0 represent the phase of Ratio20(φ) when $\alpha^{tm1} = \alpha^{tm2} = \alpha^t = 90$ (degree) and $\alpha^{tm1} = \alpha^{tm2} = \alpha^t = 0$ (degree), respectively. PHAE represent the phase of Ratio6(φ).

FIG. 14(*c*) shows a relationship between the measurement amplitude of the transmitter-receiver system shown in FIG. 6(*a*) and tool rotation angle when dip angle θ is 90 degree and formation resistivity are 100 (ohm-m) and 1 (ohm-m) in layer 1 102 and layer 2 103, respectively, and distance from tool to boundary is 10 (ft). The FIG. 14(*c*) shows a sinusoidal curve in which the difference between maximum and minimum is 2V$_{mezy}$, which is a function of the distance to boundary and the formation resistivity. The distance can be computed with the measurement of the transmitter-receiver system shown in FIG. 6.

FIG. 14(*a*)-(*b*) illustrate relationship between measurement of that Ratio20(φ) and Ratio6(φ) have a strong relationship with distance to boundary. Thus, Ratio20(φ) and Ratio6(φ) can be used to determine the boundary position ahead of a drilling bit. The above discussions are based on one transmitter-receiver system which can be used to determine formation boundary ahead of drilling bit.

Figure 15:
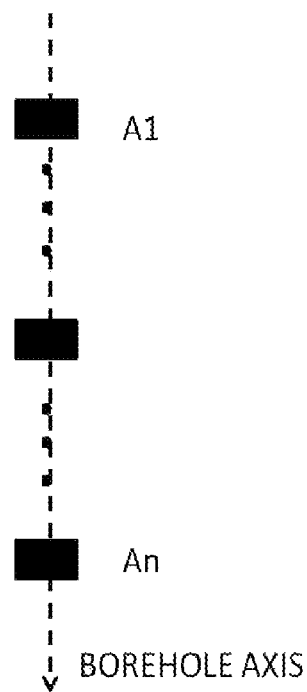
FIG. 15 shows the profile of the structure of a generalized EM LWD system.

FIG. 15 shows the structure of a look ahead and look around tool in which there are N antennas mounted on a tool body, e.g. a conductive mandrel. Each of the antennas can be electric antennae or magnetic antennas or magnetic-electric antenna, and each of the antennas can be a transmitter or a receiver, and each antenna can be tilt. All antennae will connected to an electronic device. Such an electronic device includes, but is not limited to, an electronic board that can record measurements. The structure includes at least one transmitter-receiver system as discussed above.

In one embodiment, the present invention provides an electromagnetic LWD device comprising (a) one or more transmitters configured to emit electromagnetic waves, each transmitter being a magnetic antenna transmitter or electric antenna transmitter or magnetic-electric antenna transmitter, and (b) one or more receivers configured to measure one or more electric and magnetic field parameters, each receiver being a magnetic antenna receiver or electric antenna receiver or magnetic-electric antenna receiver. The receiver(s) is configured to have a measurement or combined measurements that is (1) weak or zero in homogeneous medium, and (2) reflective of an existence of formation boundaries ahead or around the LWD device. For example, signals received by the receivers would cancel each other to let total measurement to be small, thereby enabling the signals received by the device to reflect formation boundaries. The transmitters and receivers are mounted on collar of a conductive mandrel. The device measures one or more formation parameters such as resistivity, permeability, and distance to a boundary. In one embodiment, the device can receive electromagnetic wave reflected by formation boundary ahead or around it. One of ordinary skill in the art would readily recognize and design suitable numbers of transmitters and receivers for a particular use.

In one embodiment, the magnetic-electric antenna transmitter or magnetic-electric antenna receiver comprises an open wire antenna that can be equivalent to a combination of a closed loop magnetic antenna and a straight-line electric antenna.

In another embodiment, the device comprises of one transmitter and two receivers, with the transmitter located between the two receivers. In one embodiment, the two receivers are located on both sides of a transmitter to let the combination of their measurements to be very weak or zero in a homogeneous medium, and the combination of their measurements would reflect the existence of formation boundaries ahead and/or around the device. In another embodiment, the device comprises two transmitters and one receiver, with the receiver located between the two transmitters. In one embodiment, the two transmitters are located on both sides of a receiver to let the combination of their measurements to be very weak or zero in a homogeneous medium, and the combination of their measurements would reflect the existence of formation boundaries ahead and/or around the device.

In another embodiment, the device comprises of one magnetic antenna transmitter and one electric antenna receiver, with the center of the electric receiver aligned with the center of the magnetic antenna transmitter, and the magnetic antenna transmitter comprises of one or more closed loops.

In another embodiment, the device comprises of one magnetic antenna transmitter and one electric antenna receiver, with the electric receiver located on a plane which is formed by borehole axis and normal line of the magnetic antenna, and the normal line passes the center of the magnetic antenna, and the magnetic antenna transmitter comprises of one or more closed loops.

In another embodiment, the device comprises of one magnetic antenna transmitter and one magnetic-electric antenna receiver. The voltage measurement can be expressed as $V=V_{mm}+V_{me}$.

In another embodiment, the device comprises of one electric antenna transmitter and one magnetic-electric antenna receiver. The voltage measurement can be expressed as $V=V_{em}+V_{ee}$.

In another embodiment, the device comprises of one magnetic-electric antenna transmitter and one magnetic-electric antenna receiver. The voltage measurement can be expressed as $V=V_{mm}+V_{me}+V_{em}+V_{ee}$.

In another embodiment, the device comprises of one magnetic antenna transmitter and one electric antenna receiver, and the electric antenna receiver comprises of two connected electric antenna parts that are located at either side of the magnetic transmitter.

In another embodiment, the device comprises of one magnetic antenna transmitter and one magnetic antenna receiver, and the magnetic antenna receiver comprises of two connected magnetic antenna parts, which are located at either side of the magnetic transmitter.

In another embodiment, the device comprises of one magnetic antenna transmitter and one magnetic-electric antenna receiver, and the magnetic-electric antenna receiver comprises of two connected magnetic-electric antenna parts, which are located at either side of the magnetic transmitter.

In another embodiment, the device comprises of one magnetic antenna transmitter and two electric antenna receivers with the receivers located at either side of the magnetic antenna transmitter.

In another embodiment, the device comprises of one magnetic antenna transmitter and two magnetic antenna receivers with the receivers located at either side of the magnetic antenna transmitter.

In another embodiment, the device comprises of one magnetic antenna transmitter and two magnetic-electric antenna receivers with the receivers located at either side of the magnetic transmitter.

In another embodiment, the device comprises of one electric antenna transmitter and one electric antenna receiver, and the receiver comprises of two connected electric antenna parts, which are located at either side of the transmitter.

In another embodiment, the device comprises of one electric antenna transmitter and one magnetic antenna receiver, and the receiver comprises of two connected magnetic antenna parts, which are located at either side of the transmitter.

In another embodiment, the device comprises of one electric antenna transmitter and two electric antenna receivers with the two receivers located at either side of the transmitter.

In another embodiment, the device comprises of one electric antenna transmitter and two magnetic antenna receivers with the two receivers located at either side of the transmitter.

In another embodiment, the device comprises of one receiver, and the device calculates boundary position and formation resistivity by using calculations comprising $V(\varphi)$, a ratio $$\frac{V(\varphi)}{\text{average}(V(\varphi))},$$

or both. $V(\varphi)$ is the device's measurement with respect to device rotation angle $\varphi$, and average ($V(\varphi)$) is an average of the device's measurements for all rotation angles.

In another embodiment, the device comprises of two receivers, and the device calculates boundary information by using calculations comprising the average($V(\varphi)$), the ratios $$\frac{V(\varphi)}{\text{average}(V(\varphi))}, \frac{V^1(\varphi)}{V^2(\varphi)}, \frac{V^2(\varphi)}{V^1(\varphi)}, \frac{V^1(\varphi)-V^2(\varphi)}{V^1(\varphi)+V^2(\varphi)},$$

$$\frac{V^1(\varphi)-V^2(\varphi)}{V^2(\varphi)} \text{ and } \frac{V^1(\varphi)-V^2(\varphi)}{V^1(\varphi)},$$

or both. The boundary information comprises of boundary positions, trends, and formation resistivity in both sides of boundaries. $\varphi$ is the device's rotation angle, $V^1(\varphi)$ and $V^2(\varphi)$ are measurements of two receivers with respect to the angel $\varphi$, $V(\varphi)$ is total response of receivers, $V(\varphi)=V^1(\varphi) V^2(\varphi)$, or $V(\varphi)=V^1(\varphi)+V^2(\varphi)$, average($V(\varphi)$) is the average of the $V(\varphi)$.

In another embodiment, the present invention provides a drilling tool comprising the LWD device described herein.

What is claimed is:

1. An electromagnetic Logging While Drilling (LWD) device, comprising:
   (i) at least one transmitter configured to emit electromagnetic wave, said transmitter is a magnetic antenna transmitter, or an electric antenna transmitter, or a magnetic-electric antenna transmitter; and
   (ii) at least one receiver configured to measure one or more electromagnetic field parameters, said receiver is a magnetic antenna receiver, an electric antenna receiver, or a magnetic-electric antenna receiver, wherein:
       said transmitter and receiver are mounted on a conductive mandrel,
       said receiver is configured to have a measurement or combined measurement that is (1) weak or zero in homogeneous medium, and (2) reflective of an existence of formation boundaries ahead or around the LWD device, said LWD device measures one or more formation parameters selected from the group consisting of resistivity and distance to a boundary, and when the transmitter is a magnetic antenna transmitter and the receiver is a magnetic-electric antenna receiver, said measurement is calculated by $V=V_{mm}+V_{me}$, wherein $V_{mm}$ is voltage received by a magnetic antenna, $V_{me}$ is voltage received by an electric antenna, and the electromagnetic wave is transmitted by a magnetic transmitter.

2. The device of claim 1, comprising one magnetic antenna transmitter and two receivers that are located on either side of the transmitter, said receivers are electric antenna receivers or magnetic-electric antenna receivers, wherein said measurement of the receivers in homogeneous medium is zero when the two receivers are symmetrically located on either side of the transmitter, and the measurement is used to determine formation boundary ahead or around the device.

3. The device of claim 1, comprising one magnetic antenna transmitter and one electric antenna receiver, said magnetic antenna transmitter comprises one or more closed loops, wherein a center of the electric antenna receiver is aligned with a center of the magnetic antenna transmitter.

4. The device of claim 1, comprising one magnetic antenna transmitter and one electric antenna receiver, said electric antenna receiver comprises two connected receiver parts that are located on either side of said transmitter.

5. The device of claim 1, comprising one magnetic antenna transmitter and one magnetic antenna receiver, said magnetic antenna receiver comprises two connected receiver parts that are located on either side of said transmitter.

6. The device of claim 1, comprising one magnetic antenna transmitter and two electric antenna receivers that are located on either side of said transmitter, wherein a sum of voltages measured by said two receivers is zero when said two receivers are symmetrically located on either side of the transmitter.

7. The device of claim 1, comprising one magnetic antenna transmitter and two magnetic antenna receivers that are located on either side of said transmitter, wherein a sum of voltages measured by said two receivers is zero when said two receivers are symmetrically located on either side of the transmitter.

8. The device of claim 1, comprising one magnetic antenna transmitter and one magnetic-electric antenna receiver.

9. The device of claim 1, comprising one electric antenna transmitter and one magnetic antenna receiver, said receiver comprises two connected receiver parts that are located on either side of said transmitter.

10. The device of claim 1, comprising one magnetic antenna transmitter and one electric antenna receiver, said receiver is located on a plane formed by a borehole axis and a normal line of said transmitter, said normal line passes a center of said transmitter.

11. The device of claim 1, comprising one magnetic antenna transmitter and one magnetic-electric antenna receiver, said receiver comprises two connected receiver parts that are located on either side of said transmitter.

12. The device of claim 1, wherein said magnetic-electric antenna transmitter or magnetic-electric antenna receiver comprises an open wire antenna that is equivalent to a combination of a closed loop magnetic antenna and a straight line electric antenna.

13. The device of claim 1, wherein said electric antenna receiver is located on a plane formed by a borehole axis and a normal line of said transmitter, said normal line passes through a center of said transmitter.

14. An electromagnetic Logging While Drilling (LWD) device, comprising:
 (i) at least one transmitter configured to emit electromagnetic wave, said transmitter is a magnetic antenna transmitter, or an electric antenna transmitter, or a magnetic-electric antenna transmitter; and
 (ii) at least one receiver configured to measure one or more electromagnetic field parameters, said receiver is a magnetic antenna receiver, an electric antenna receiver, or a magnetic-electric antenna receiver,
 wherein:
  said transmitter and receiver are mounted on a conductive mandrel,
  said receiver is configured to have a measurement or combined measurement that is (1) weak or zero in homogeneous medium, and (2) reflective of an existence of formation boundaries ahead or around the LWD device,
  said LWD device measures one or more formation parameters selected from the group consisting of resistivity and distance to a boundary, and
 when the transmitter is an electric antenna transmitter and the receiver is a magnetic-electric antenna receiver, said measurement is calculated by $V=V_{em}+V_{ee}$, wherein $V_{em}$ is voltage received by a magnetic antenna, $V_{ee}$ is voltage received by an electric antenna, and the electromagnetic wave is transmitted by an electric transmitter.

15. An electromagnetic Logging While Drilling (LWD) device, comprising:
 (i) at least one transmitter configured to emit electromagnetic wave, said transmitter is a magnetic antenna transmitter, or an electric antenna transmitter, or a magnetic-electric antenna transmitter; and
 (ii) at least one receiver configured to measure one or more electromagnetic field parameters, said receiver is a magnetic antenna receiver, an electric antenna receiver, or a magnetic-electric antenna receiver,
 wherein:
  said transmitter and receiver are mounted on a conductive mandrel,
  said receiver is configured to have a measurement or combined measurement that is (1) weak or zero in homogeneous medium, and (2) reflective of an existence of formation boundaries ahead or around the LWD device,
  said LWD device measures one or more formation parameters selected from the group consisting of resistivity and distance to a boundary, and
 when the transmitter is a magnetic-electric antenna transmitter and the receiver is a magnetic-electric antenna receiver, said measurement is calculated by $V=V_{mm}+V_{me}+V_{em}+V_{ee}$, wherein $V_{mm}$ is voltage received by a magnetic antenna, $V_{me}$ is voltage received by an electric antenna, $V_{em}$ is voltage received by a magnetic antenna, $V_{ee}$ is voltage received by an electric antenna, and the electromagnetic wave is transmitted by an electric transmitter.

16. An electromagnetic Logging While Drilling (LWD) device, comprising:

(i) at least one transmitter configured to emit electromagnetic wave, said transmitter is a magnetic antenna transmitter, or an electric antenna transmitter, or a magnetic-electric antenna transmitter; and
(ii) at least one receiver configured to measure one or more electromagnetic field parameters, said receiver is a magnetic antenna receiver, an electric antenna receiver, or a magnetic-electric antenna receiver, wherein:
said transmitter and receiver are mounted on a conductive mandrel,
said receiver is configured to have a measurement or combined measurement that is (1) weak or zero in homogeneous medium, and (2) reflective of an existence of formation boundaries ahead or around the LWD device,
said LWD device measures one or more formation parameters selected from the group consisting of resistivity and distance to a boundary, and
the device is used to determine boundary position(s) and resistivity through calculations comprising one or both of response $V(\varphi)$ and ratio $$\frac{V(\varphi)}{\text{average}(V(\varphi))},$$

wherein response $V(\varphi)$ is measurement with respect to device rotation angle $\varphi$, and average($V(\varphi)$) is an average of measurements for all device rotation angles.

17. An electromagnetic Logging While Drilling (LWD) device, comprising:
(i) at least one transmitter configured to emit electromagnetic wave, said transmitter is a magnetic antenna transmitter, or an electric antenna transmitter, or a magnetic-electric antenna transmitter; and
(ii) at least one receiver configured to measure one or more electromagnetic field parameters, said receiver is a magnetic antenna receiver, an electric antenna receiver, or a magnetic-electric antenna receiver, wherein:
said transmitter and receiver are mounted on a conductive mandrel,
said receiver is configured to have a measurement or combined measurement that is (1) weak or zero in homogeneous medium, and (2) reflective of an existence of formation boundaries ahead or around the LWD device,
said LWD device measures one or more formation parameters selected from the group consisting of resistivity and distance to a boundary, and
the device is used to determine boundary information through calculations comprising one or more of average($V(\varphi)$), ratios $$\frac{V(\varphi)}{\text{average}(V(\varphi))}, \frac{V^1(\varphi)}{V^2(\varphi)}, \frac{V^2(\varphi)}{V^1(\varphi)}, \frac{V^1(\varphi)-V^2(\varphi)}{V^1(\varphi)+V^2(\varphi)},$$

$$\frac{V^1(\varphi)-V^2(\varphi)}{V^2(\varphi)} \text{ and } \frac{V^1(\varphi)-V^2(\varphi)}{V^1(\varphi)},$$

said boundary information comprises one or more of boundary positions, trends, and formation resistivity in both sides of a boundary, wherein $\varphi$ is device rotation angle, $V^1(\varphi)$ and $V^2(\varphi)$ are measurements of two receiver parts with respect to an angle $\varphi$, $V(\varphi)$ is a total response of said receiver, $V(\varphi)=V^1(\varphi)-V^2(\varphi)$, or $V(\varphi)=V^1(\varphi)+V^2(\varphi)$, and average($V(\varphi)$) is an average of $V(\varphi)$.

18. A drilling tool comprising the device of claim 1.
19. The device of claim 1, wherein said receiver comprises two separated receiver parts which are connected to each other by an electrical line, said separated receiver parts together form an electric antenna receiver, or a magnetic antenna receiver, or a magnetic-electric antenna receiver.
20. A drilling tool comprising the device of claim 14.
21. A drilling tool comprising the device of claim 15.
22. A drilling tool comprising the device of claim 16.
23. A drilling tool comprising the device of claim 17.

* * * * *